US008749673B2

(12) United States Patent  
Imagawa et al.

(10) Patent No.: US 8,749,673 B2
(45) Date of Patent: Jun. 10, 2014

(54) IMAGE GENERATION DEVICE AND IMAGE GENERATION SYSTEM, METHOD AND PROGRAM

(71) Applicant: Panasonic Corporation, Osaka (JP)

(72) Inventors: Taro Imagawa, Osaka (JP); Takeo Azuma, Kyoto (JP); Sanzo Ugawa, Osaka (JP); Yusuke Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 44 days.

(21) Appl. No.: 13/693,188

(22) Filed: Dec. 4, 2012

(65) Prior Publication Data

US 2013/0093923 A1 Apr. 18, 2013

Related U.S. Application Data

(63) Continuation of application No. PCT/JP2011/006687, filed on Nov. 30, 2011.

(30) Foreign Application Priority Data

Dec. 16, 2010 (JP) ................................ 2010-280666

(51) Int. Cl.
*H04N 9/083* (2006.01)
*H04N 3/14* (2006.01)
*H04N 5/335* (2011.01)
*H04N 9/04* (2006.01)
*H04N 9/07* (2006.01)
*H04N 9/68* (2006.01)

(52) U.S. Cl.
USPC ........... 348/279; 348/234; 348/237; 348/266; 348/272

(58) Field of Classification Search
CPC ............ H04N 9/045; H04N 2209/047; H04N 5/2353; H04N 5/243; H04N 5/3537; H04N 2209/042; H04N 5/3535; G06K 9/036; G06K 7/14

USPC .................................. 348/234–239, 266–279
See application file for complete search history.

(56) References Cited

U.S. PATENT DOCUMENTS 7,978,240 B2 * 7/2011 Kido et al. ..................... 348/276
8,294,748 B2 * 10/2012 Stec et al. ........................ 348/36

(Continued)

FOREIGN PATENT DOCUMENTS

JP 2007-214832 A 8/2007
JP 2009-044593 A 2/2009

(Continued)

OTHER PUBLICATIONS

International Search Report for corresponding International Application No. PCT/JP2011/006687 mailed Feb. 28, 2012.

(Continued)

*Primary Examiner* — Chia-Wei A Chen
(74) *Attorney, Agent, or Firm* — Renner, Otto, Boisselle & Sklar, LLP

(57) ABSTRACT

The image generation device generates a new moving picture of a subject based on first and second moving pictures shot with a single-chip color image sensor, which detects two light rays including first and second color components, respectively, to represent the first and second color components of the subject. As the first moving picture has been shot in a longer exposure time than the second moving picture, the first picture has a lower frame rate than the second picture. The image generation device includes: a getting section which gets video signals representing the first and second moving pictures, respectively; a processing section which generates a new moving picture with as high a frame rate as the second moving picture based on the respective video signals representing the first and second moving pictures gotten; and an output section which outputs the new moving picture.

15 Claims, 25 Drawing Sheets

(56) References Cited

U.S. PATENT DOCUMENTS

| | | | |
|---|---|---|---|
| 8,310,563 B2* | 11/2012 | Yamashita et al. | 348/239 |
| 2002/0012055 A1* | 1/2002 | Koshiba et al. | 348/273 |
| 2008/0055436 A1* | 3/2008 | Sarwari et al. | 348/272 |
| 2008/0084486 A1* | 4/2008 | Enge et al. | 348/239 |
| 2008/0173794 A1 | 7/2008 | Oike et al. | |
| 2009/0027534 A1 | 1/2009 | Yasuo et al. | |
| 2009/0040353 A1 | 2/2009 | Yamamoto | |
| 2009/0051793 A1* | 2/2009 | Smith | 348/266 |
| 2010/0085452 A1* | 4/2010 | Hirakawa et al. | 348/273 |
| 2010/0202623 A1* | 8/2010 | Snider et al. | 381/58 |
| 2010/0315536 A1* | 12/2010 | Wang | 348/239 |
| 2011/0019032 A1* | 1/2011 | Pinsky et al. | 348/238 |
| 2011/0032395 A1* | 2/2011 | Kido et al. | 348/272 |
| 2011/0141226 A1* | 6/2011 | Stec et al. | 348/36 |
| 2011/0285886 A1 | 11/2011 | Kato et al. | |
| 2011/0317027 A1* | 12/2011 | Shinmei et al. | 348/223.1 |
| 2012/0002082 A1* | 1/2012 | Johnson et al. | 348/234 |
| 2012/0069198 A1* | 3/2012 | Steinberg et al. | 348/207.1 |
| 2012/0069222 A1* | 3/2012 | Steinberg et al. | 348/239 |

FOREIGN PATENT DOCUMENTS

| | | |
|---|---|---|
| JP | 2009-055589 A | 3/2009 |
| JP | 2010-183357 A | 8/2010 |

OTHER PUBLICATIONS

Form PCT/ISA/237 for corresponding International Application No. PCT/JP2011/006687 mailed Feb. 28, 2012 and partial English translation.

P. Anandan; "A Computational Framework and an algorithm for the measurement of visual motion", International Journal of Computer Vision, vol. 2, pp. 283-310, 1989.

Zelnik-Manor et al., "Multi-body Segmentation: Revisiting Motion Consistency", ECCV (2002), pp. 1-12.

* cited by examiner (a)  (b)

t TH FRAME t+1 TH FRAME (a) t=0

| G | R | G | R | G | R | G |
|---|---|---|---|---|---|---|
| B | G | B | G | B | G | B |
| G | R | G | R | G | R | G |
| B | G | B | G | B | G | B |
| G | R | G | R | G | R | G |
| B | G | B | G | B | G | B |
| G | R | G | R | G | R | G |

| S | R | S | R | S | R | S | R | S | R | S | R | S | R |
|---|---|---|---|---|---|---|---|---|---|---|---|---|---|
| B | G | B | G | B | G | B | G | B | G | B | G | B | G |
| S | R | S | R | S | R | S | R | S | R | S | R | S | R |
| B | G | B | G | B | G | B | G | B | G | B | G | B | G |
| S | R | S | R | S | R | S | R | S | R | S | R | S | R |
| B | G | B | G | B | G | B | G | B | G | B | G | B | G |
| S | R | S | R | S | R | S | R | S | R | S | R | S | R |
| B | G | B | G | B | G | B | G | B | G | B | G | B | G |
| S | R | S | R | S | R | S | R | S | R | S | R | S | R |
| B | G | B | G | B | G | B | G | B | G | B | G | B | G |
| S | R | S | R | S | R | S | R | S | R | S | R | S | R |
| B | G | B | G | B | G | B | G | B | G | B | G | B | G |
| S | R | S | R | S | R | S | R | S | R | S | R | S | R |
| B | G | B | G | B | G | B | G | B | G | B | G | B | G |

(a)

(b)

(c)

(d)

IMAGE GENERATION DEVICE AND IMAGE GENERATION SYSTEM, METHOD AND PROGRAM

This is a continuation of International Application No. PCT/JP2011/006687, with an international filing date of Nov. 30, 2011, which claims priority of Japanese Patent Application No. 2010-280666, filed on Dec. 16, 2010, the contents of which are hereby incorporated by reference.

BACKGROUND

1. Technical Field

The present application relates to an image processing technology for generating a moving picture and more particularly relates to an image processing technology for generating a new moving picture representing an object based on moving pictures which are made up of pixels that have been obtained by shooting the same object (or subject) under multiple different shooting conditions.

2. Description of the Related Art

A three-chip image capturing method is one of various image capturing methods for use to capture a color image. According to the three-chip image capturing method, the incoming light is separated through an optical system into RGB light rays, which are then received at respectively different image sensors. Since all of the incoming light is received at those image sensors according to the three-chip image capturing method, the incoming light can be used highly efficiently and a high color resolution can be achieved as well. On the other hand, a single-chip color image capturing scheme that does not use such a color separating optical system is used extensively in small and cheap cameras. Since transmissive RGB color filters are arranged spatially alternately (e.g., in the Bayer arrangement pattern) according to the single-chip image capturing scheme, the color resolution decreases. In addition, since light ray other than the ones in the transmitted colors are either absorbed or reflected, the incoming light cannot be used so efficiently and the sensitivity becomes low, which is a problem with the single-chip method.

To overcome such a problem by increasing the color resolution and sensitivity (i.e., the SNR) of the single-chip color image capturing scheme, a known image capture device calculates a virtual signal value based on the values of adjacent pixels (see Japanese Patent Application Laid-Open Publication No. 2009-55589, for example). According to Japanese Patent Application Laid-Open Publication No. 2009-55589, by using the pixel value of a G pixel as a reference pixel and those of surrounding R and B pixels at the pixel location of the G pixel itself, virtual R and B signals are calculated. In this manner, the number of R and B pixels can be increased in each pixel block consisting of multiple vertical and horizontal pixels surrounding the reference pixel, and the color resolutions and SNR of the R and B signals can be increased.

SUMMARY

The conventional technique needs further improvement in view of quality of an moving picture, of which the color resolution and sensitivity (the degree of exposure and SNR) have been both increased.

One non-limiting, and exemplary embodiment provides a technique to overcome such a problem with the related art by turning a moving picture that has been shot with a single-chip image sensor into a high-quality moving picture, of which the color resolution and sensitivity (i.e., the degree of exposure and SNR) have been both increased.

In one general aspect, an image generation device which generates a new moving picture of a subject based on first, second, third and fourth moving pictures that represent first, second, third and fourth color components of the subject, respectively, and that have been shot with a single-chip color image sensor, which detects light rays including the first, second, third and fourth color components, respectively. The first and second color components are the same color component. The third and fourth color components are not only different from the first and second color components but also different from each other. As the first moving picture has been shot in a longer exposure time than the second moving picture, the first moving picture has a lower frame rate than the second moving picture. The third and fourth moving pictures have as high a frame rate as the second moving picture. Each of three video signals respectively representing the second, third and fourth moving pictures includes an identification header, containing information about a time lag between exposure timings, and moving picture data. The image generation device includes: a getting section configured to get the video signals representing the first, second, third and fourth moving pictures, respectively; a processing section configured to generate a new moving picture that has as high a frame rate as the second moving picture based on the respective video signals representing the first, second, third and fourth moving pictures that have been gotten; and an output section configured to output the new moving picture. The getting section gets at least the video signals representing the second and third moving pictures at different timings.

According to the above aspect, the above problem is overcome.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

Figure 9:
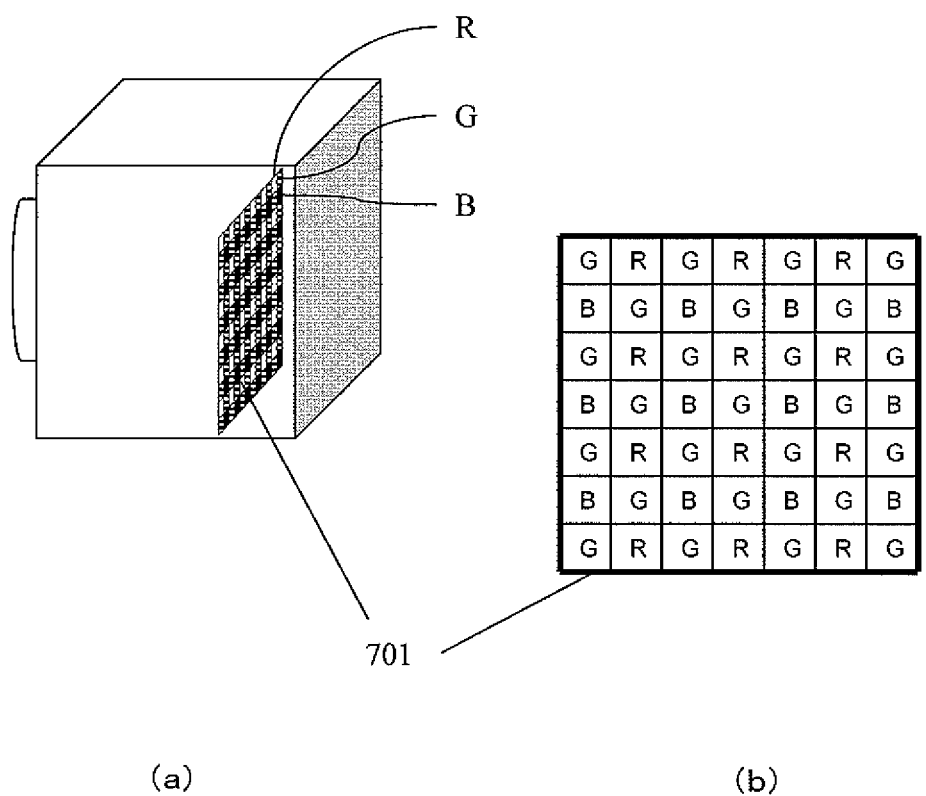

Portion (a) and (b) of FIG. 9 illustrate a configuration for a single-chip image sensor 701 with an RGB color filter arrangement.

Figure 10A:
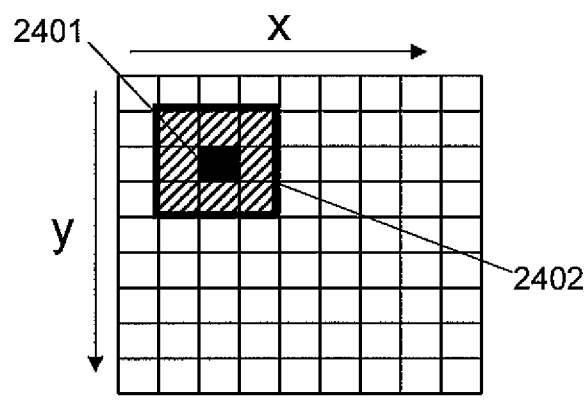
Figure 10B:
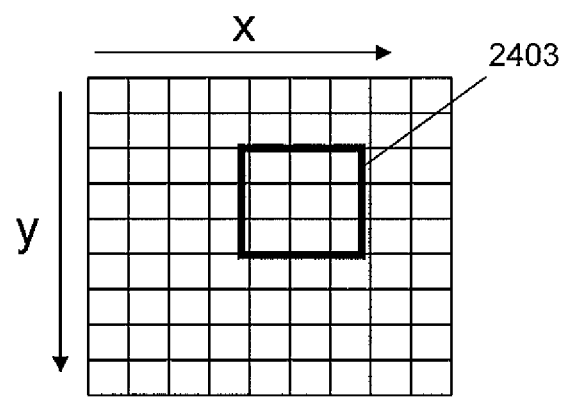

FIGS. 10A and 10B illustrate arrangements of pixels in $t^{th}$ and $(t+1)^{th}$ frames, respectively, in connection with motion detection processing.

Figure 11:
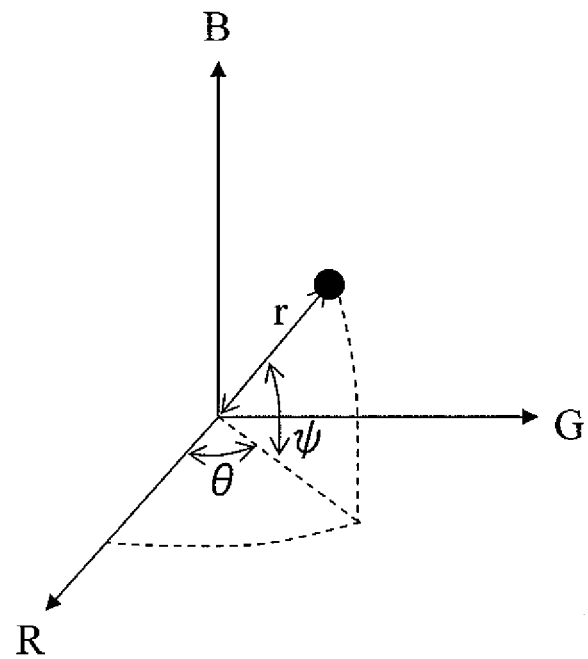

FIG. 11 illustrates an exemplary correspondence between the RGB color space and the spherical coordinate system ($\theta$, $\psi$, r).

Figure 12:
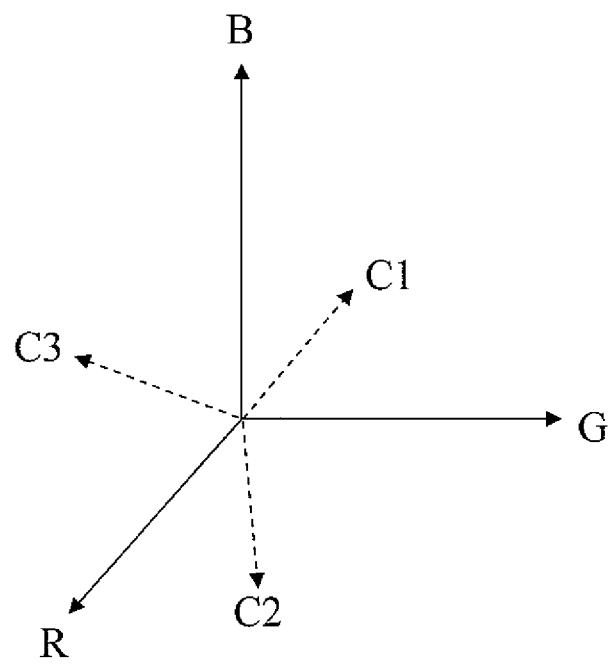

FIG. 12 shows an example of the axes of eigenvectors (C1, C2, C3) in the RGB color space.

Figure 13:
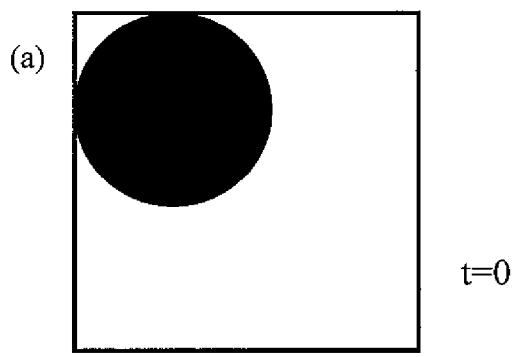
Figure 13:
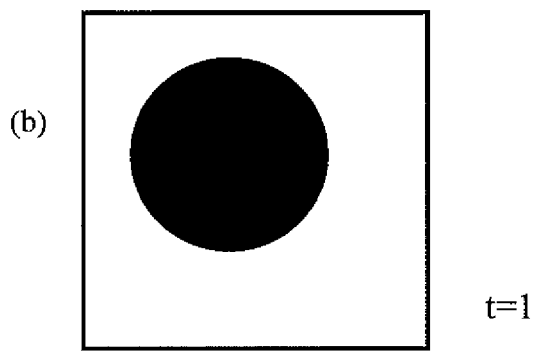
Figure 13:
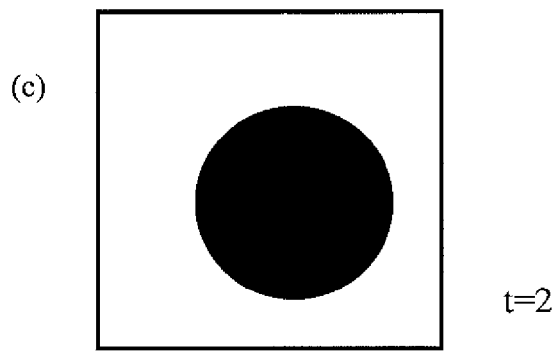
Figure 13:
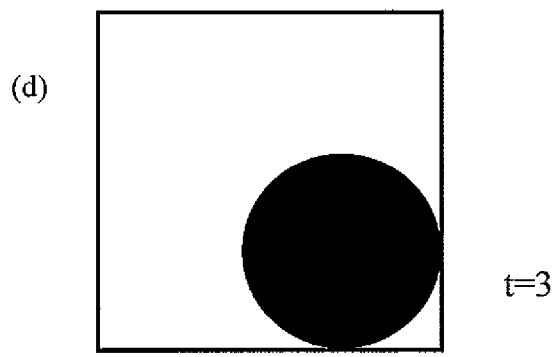

Portions (a) through (d) of FIG. 13 indicate the positions of the subject at respective points in time (t=0, 1, 2, 3) when a series of frames are shot.

Figure 14:
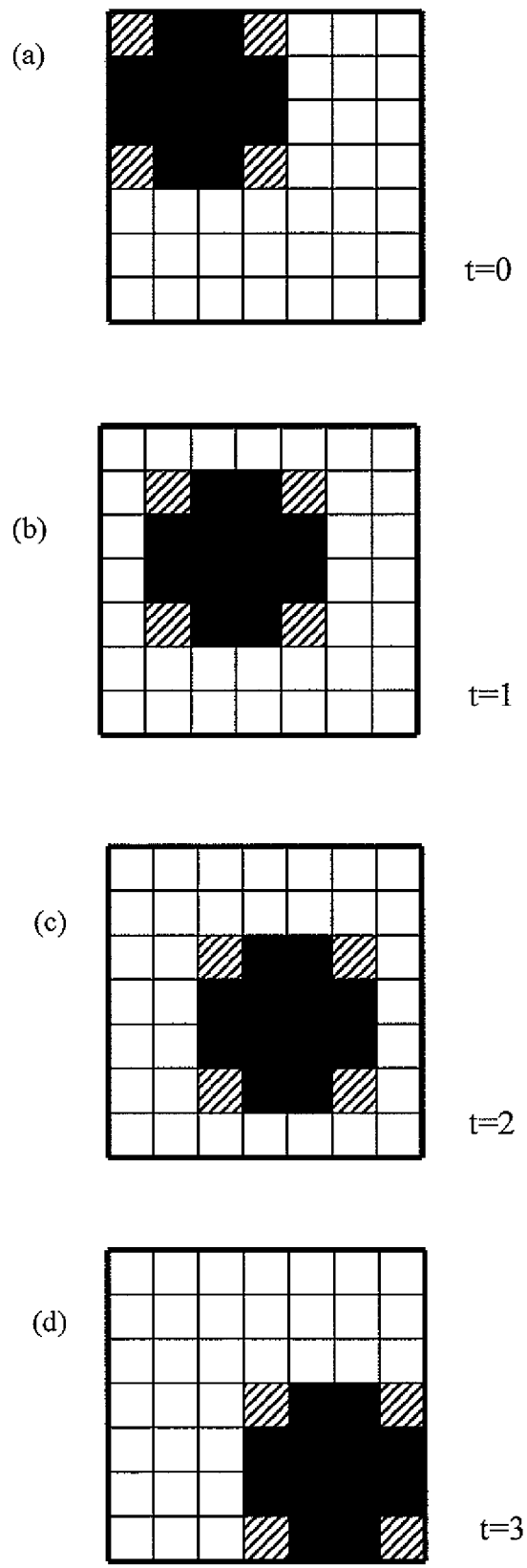

Portions (a) through (d) of FIG. 14 show, in the order of time (t=0, 1, 2, 3), target moving pictures to be obtained by shooting the subject shown in Portions (a) through (d) of FIG. 13.

FIG. 15 shows an example of an RGB color filter arrangement with the same resolution as the target moving picture.

Figure 16:
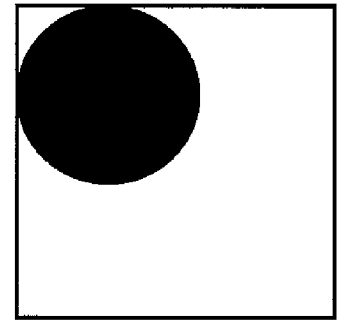
Figure 16:
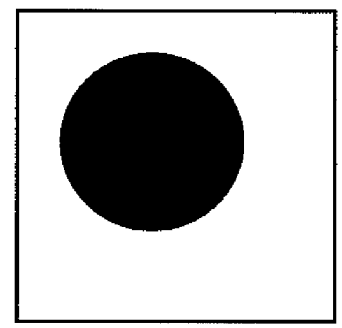
Figure 16:
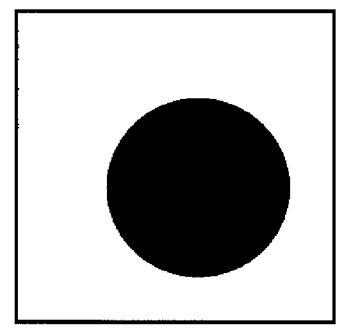
Figure 16:
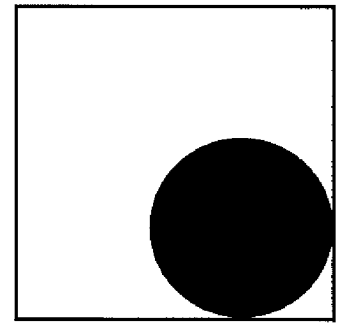

Portions (a) through (d) of FIG. 16 show the pictures generated in the color green and the subject pictures at the respective times (t=0, 1, 2, 3) on the left and right hand sides, respectively.

Figure 17:
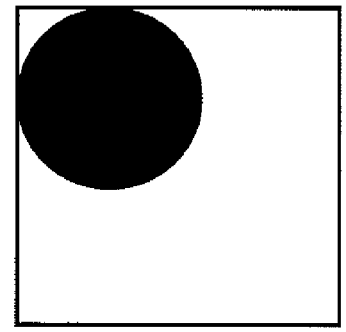
Figure 17:
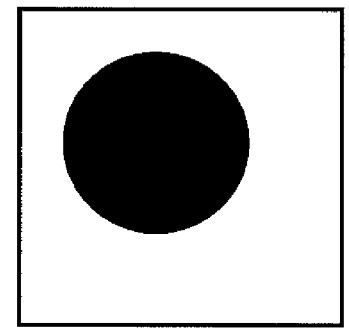
Figure 17:
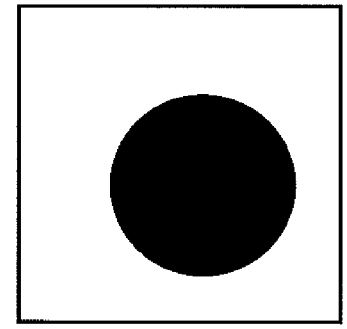
Figure 17:
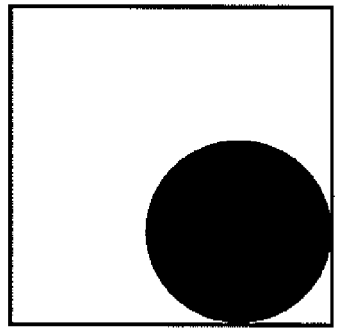

Portions (a) through (d) of FIG. 17 show the pictures generated in the color red and the subject pictures at the respective times (t=0, 1, 2, 3) on the left and right hand sides, respectively.

Figure 18:
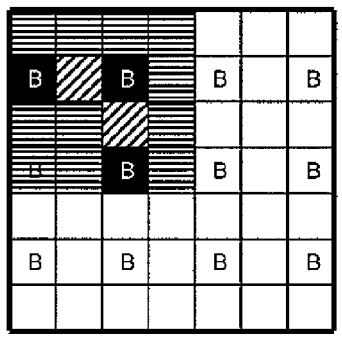
Figure 18:
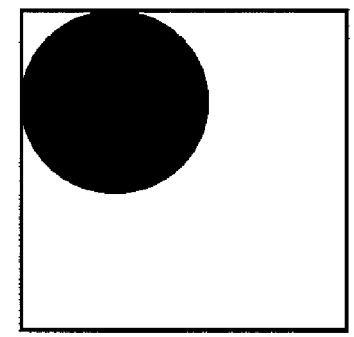
Figure 18:
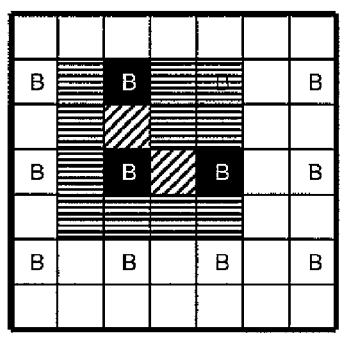
Figure 18:
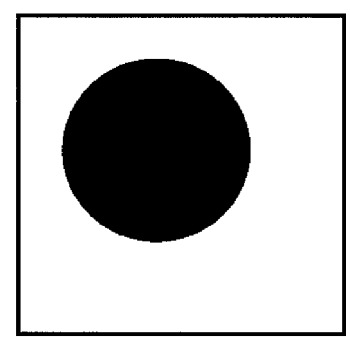
Figure 18:
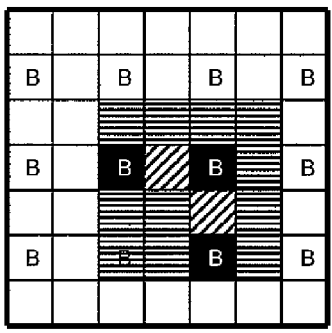
Figure 18:
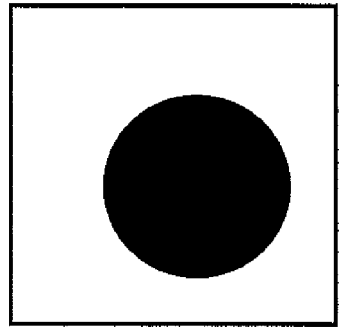
Figure 18:
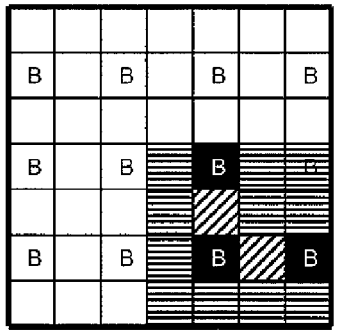
Figure 18:
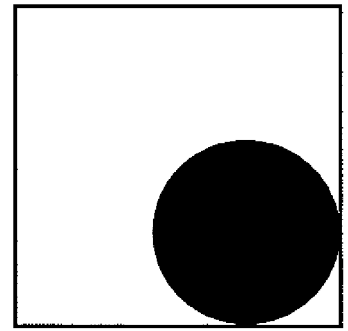

Portions (a) through (d) of FIG. 18 show the pictures generated in the color blue and the subject pictures at the respective times (t=0, 1, 2, 3) on the left and right hand sides, respectively.

FIG. 19 shows the arrangement of color filters for obtaining the picture to be input according to the method of the present disclosure and also shows a difference in exposure time and a difference in frame rate between respective pixels.

Figure 20:
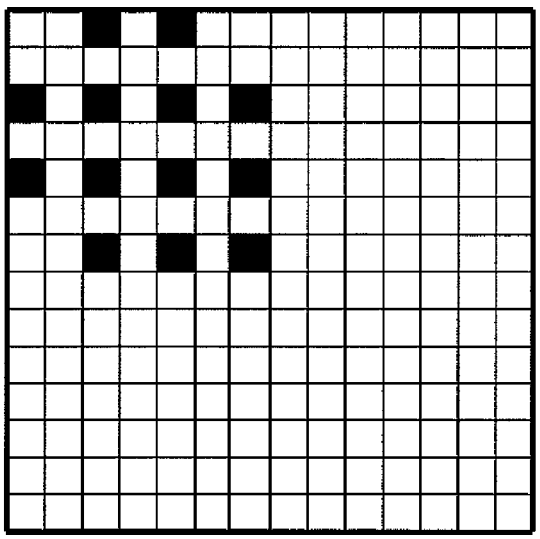
Figure 20:
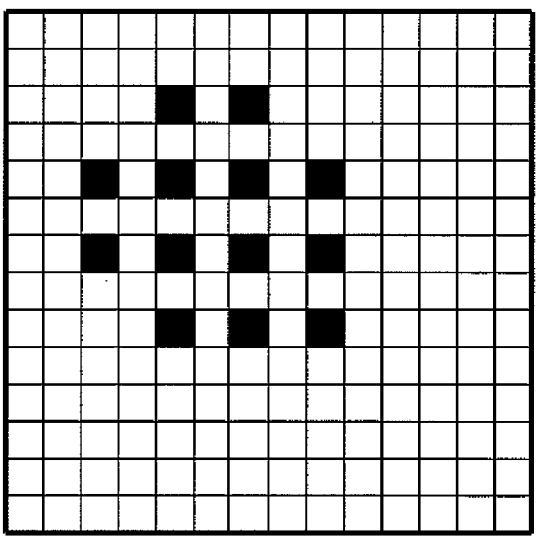
Figure 20:
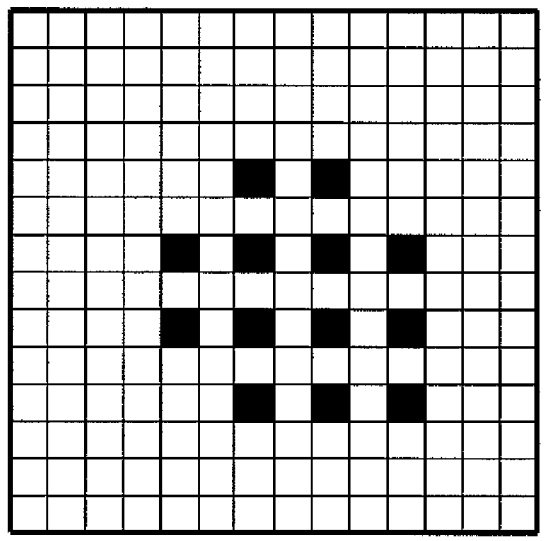
Figure 20:
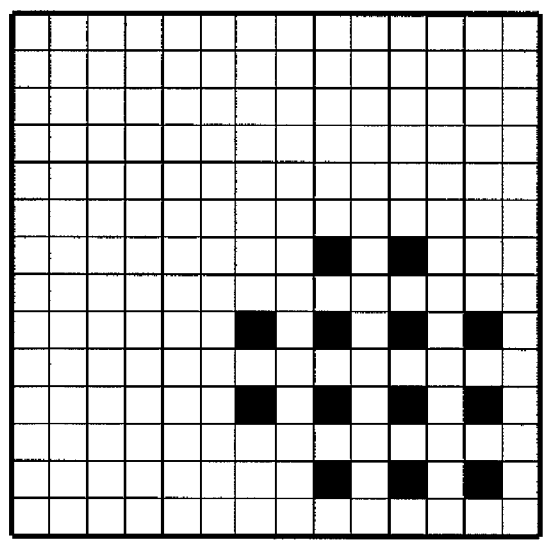

Portions (a) through (d) of FIG. 20 show the G pictures that have been gotten for the S pixels in the order of time (t=0, 1, 2, 3).

Figure 21:
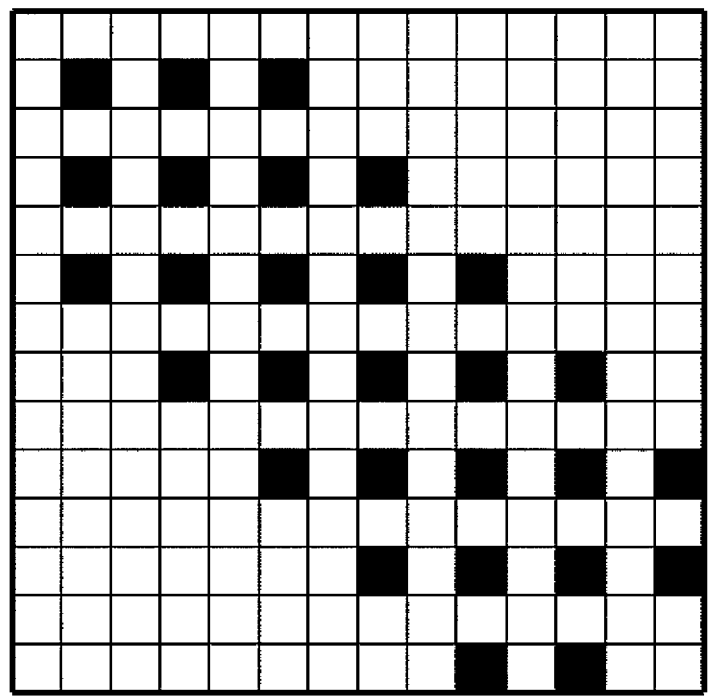

FIG. 21 shows a picture that has been gotten for the G pixels.

Figure 22:
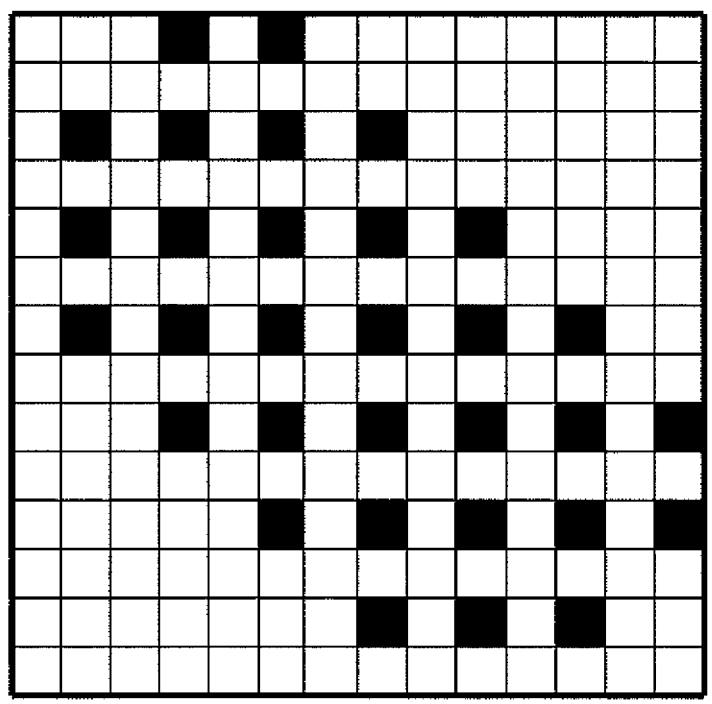

FIG. 22 shows R pixels of an R picture that has been obtained through a long exposure process.

Figure 23:
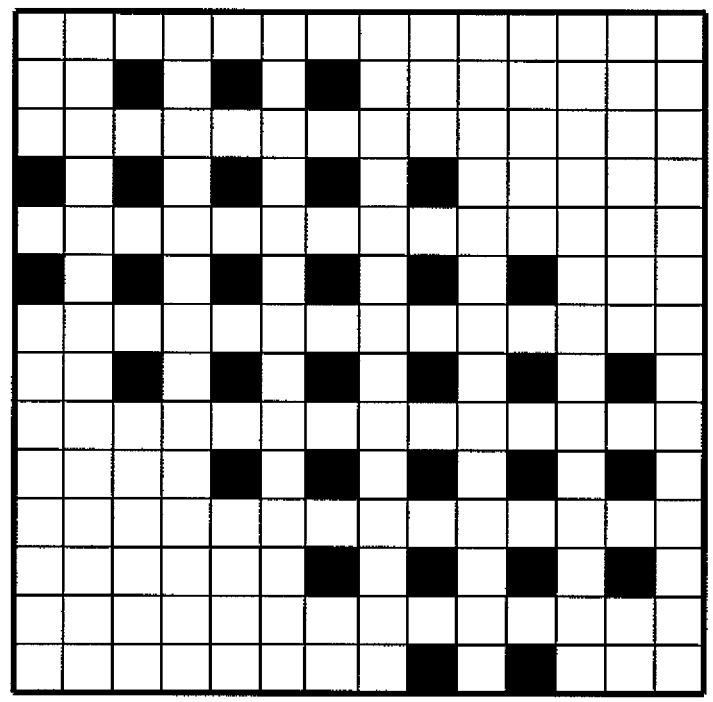

FIG. 23 shows B pixels of a B picture that has been obtained through a long exposure process.

Figure 24A:
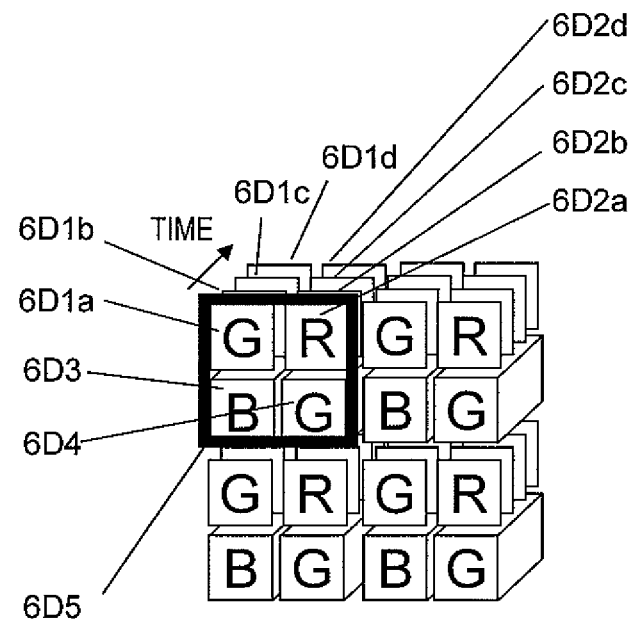
Figure 24B:
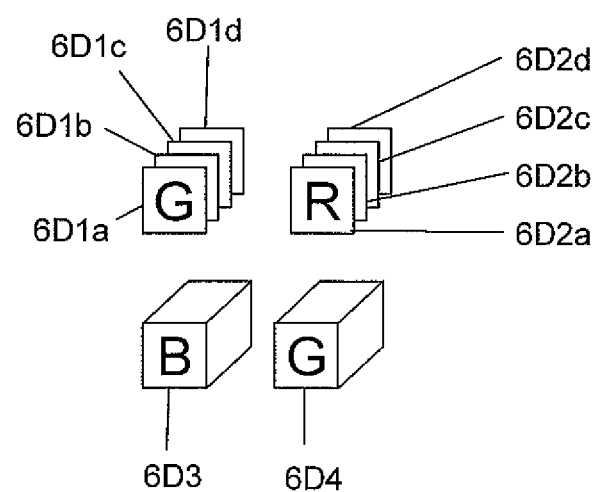

FIGS. 24A and 24B illustrate pixels to have their shooting conditions matched to each other.

Figure 25A:
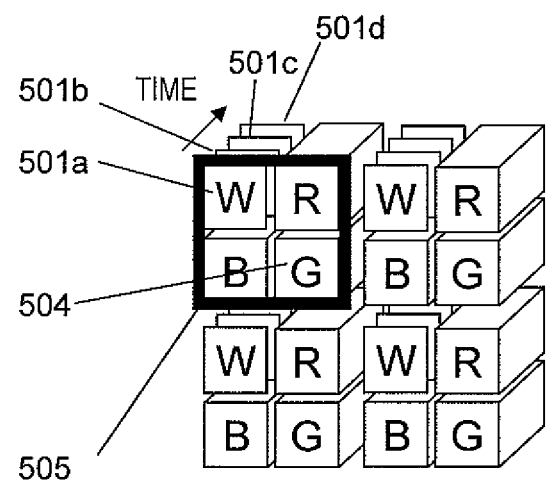

FIG. 25A shows an example in which the first moving picture is made up of transparent pixels W (501a through 501d) with the respective color components of RGB.

Figure 25B:
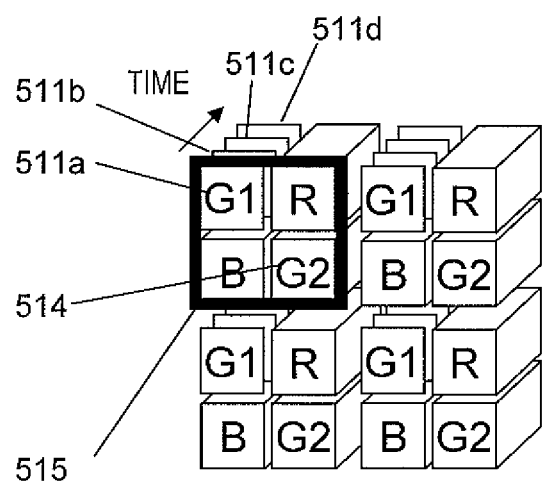

FIG. 25B shows an example in which the first and second moving pictures are made up of two different kinds of green pixels G1 (511a through 511d) and G2 (514) which represent the same color green to the human visual sensation but which have different wavelength characteristics.

Figure 26:
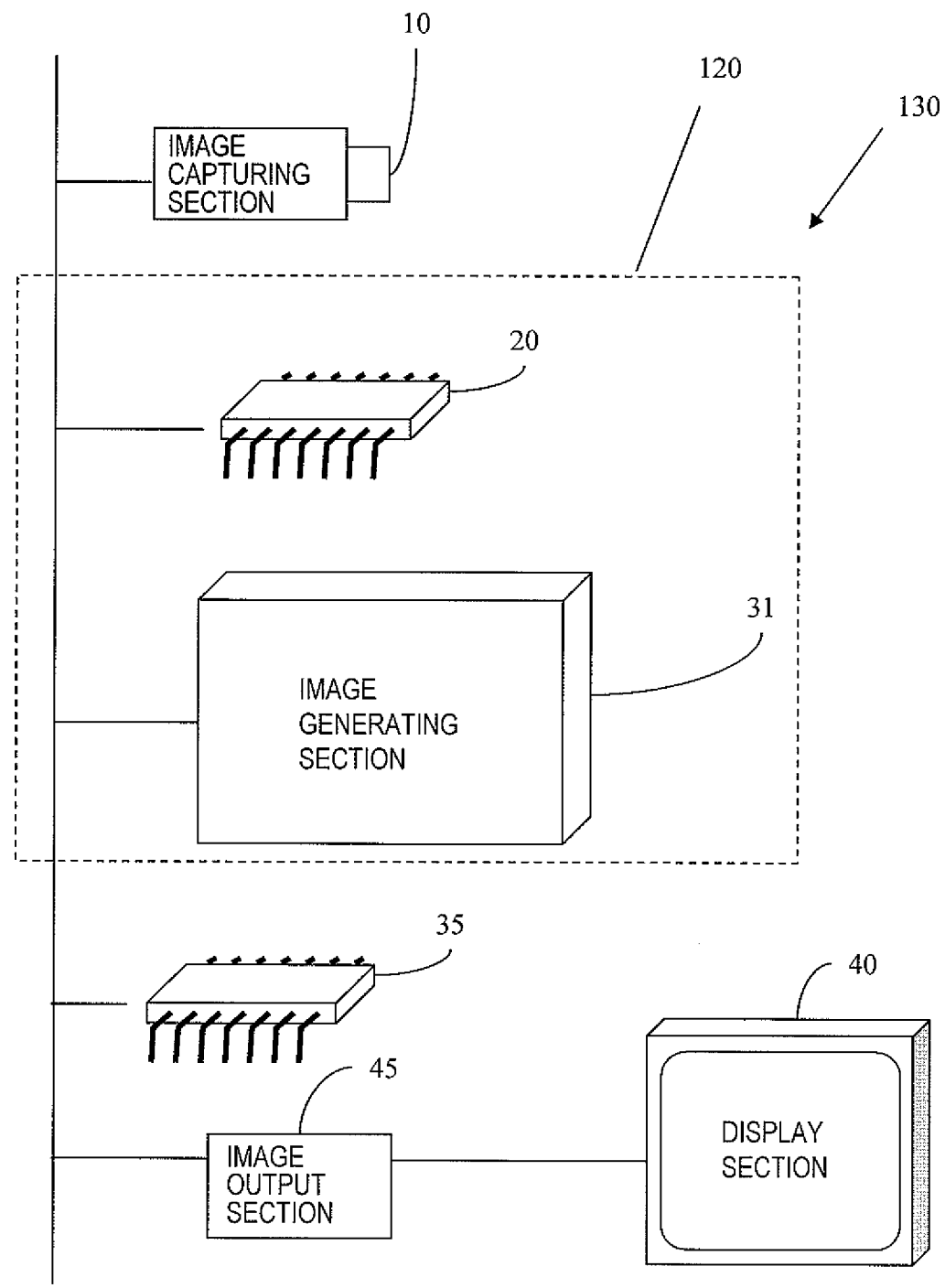

FIG. 26 illustrates a configuration for an image generation system 130 as a second embodiment.

Figure 27:
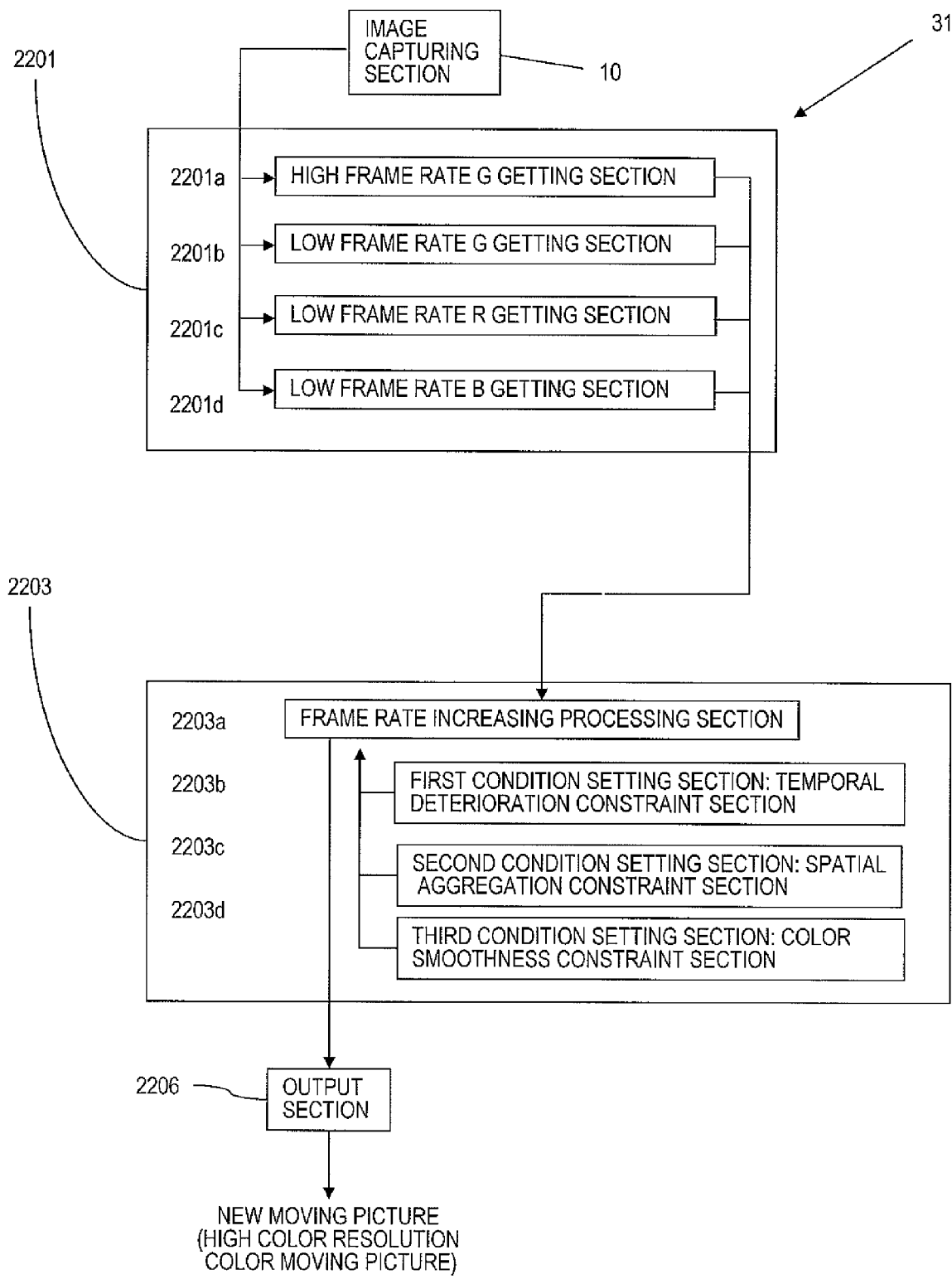

FIG. 27 illustrates an internal configuration for the image generating section 31 of the second embodiment.

Figure 28:
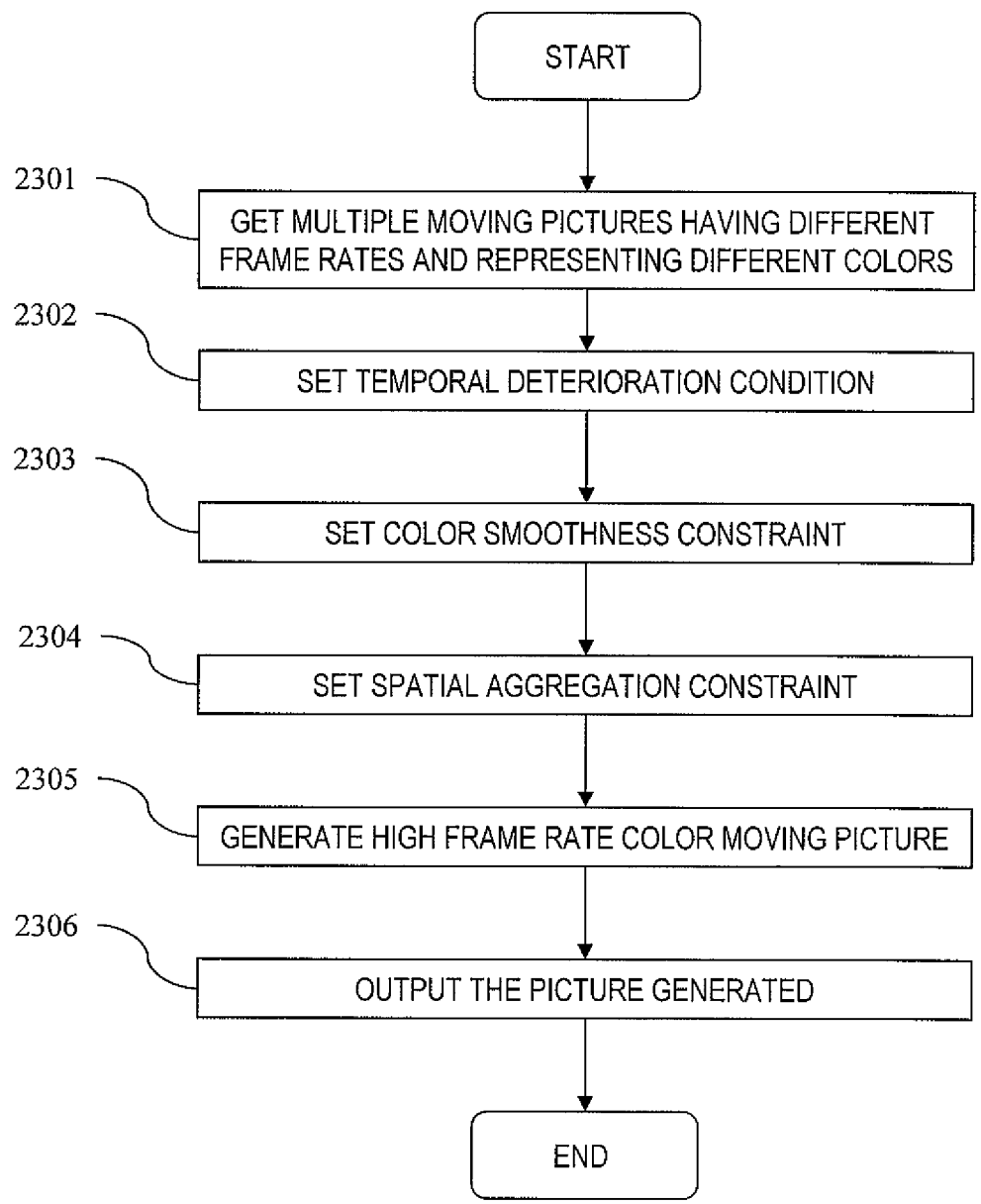

FIG. 28 is a flowchart showing the procedure of processing to be carried out by the image generating section 31 of this embodiment.

Figure 29:
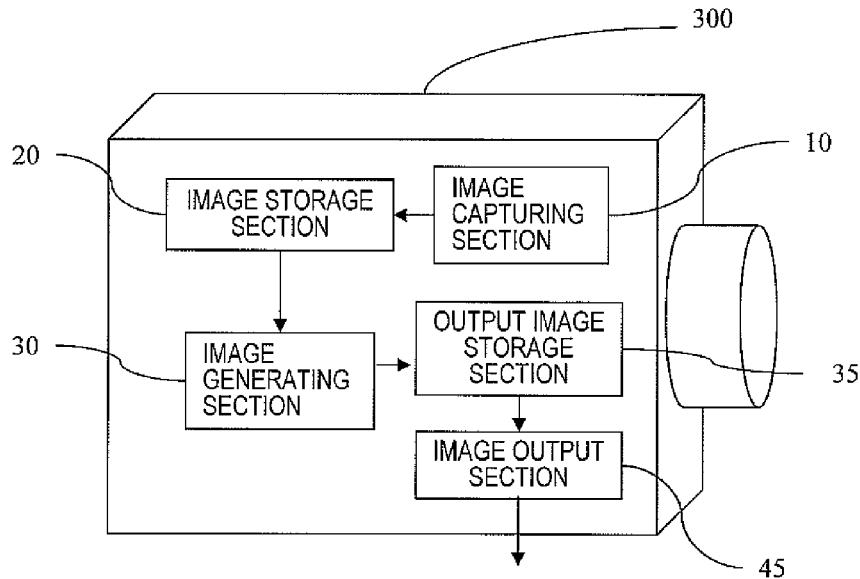

FIG. 29 illustrates an image generation system 300 with no display section.

Figure 30:
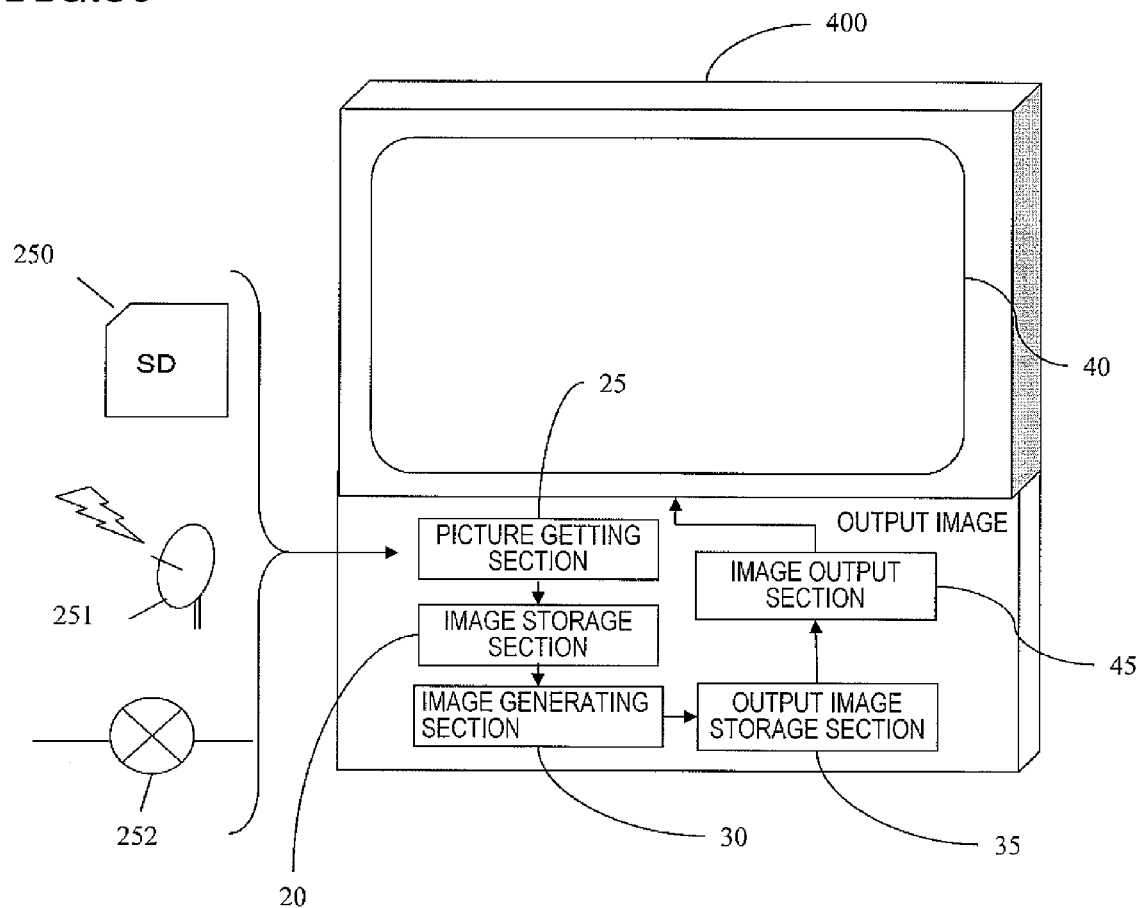

FIG. 30 illustrates an image generation system 400 with no image capturing section 10.

DETAILED DESCRIPTION

Before specific embodiments of the present disclosure are described, first of all, the problem of the conventional technique will be described.

The conventional image generation device calculates the virtual signal values based on a single-chip input image, and therefore, the color resolution becomes lower than the resolution of the output image. In addition, since the device tries to increase the SNR by setting the size of the pixel block to be larger than the pixel size of the output image, the color resolution further decreases. That is to say, there is a problem to overcome in order to increase the color resolution and the sensitivity at the same time.

Those problems with the related art are overcome by the following aspects of the present disclosure.

In one aspect of the present disclosure, an image generation device generates a new moving picture of a subject based on first, second, third and fourth moving pictures that represent first, second, third and fourth color components of the subject, respectively, and that have been shot with a single-chip color image sensor, which detects light rays including the first, second, third and fourth color components, respectively. The first and second color components are the same color component, and the third and fourth color components are not only different from the first and second color components but also different from each other. As the first moving picture has been shot in a longer exposure time than the second moving picture, the first moving picture has a lower frame rate than the second moving picture. The third and fourth moving pictures have as high a frame rate as the second moving picture. Each of three video signals respectively representing the second, third and fourth moving pictures includes an identification header, containing information about a time lag between exposure timings, and moving picture data. The image generation device includes: a getting section configured to get the video signals representing the first, second, third and fourth moving pictures, respectively; a processing section configured to generate a new moving picture that has as high a frame rate as the second moving picture based on the respective video signals representing the first, second, third and fourth moving pictures that have been gotten; and an output section configured to output the new moving picture. The getting section getting at least the video signals representing the second and third moving pictures at different timings In one embodiment, the getting section may get video signals representing the first and second moving pictures, of which the first and second color components are identical with each other.

In one embodiment, the getting section may get video signals representing the first and second moving pictures in the color green.

In one embodiment, the getting section may get a video signal representing the first moving picture in the color green and a video signal representing the second moving picture that is comprised of multiple color components including a color green component.

In one embodiment, the wavelength range of the color green may include first and second wavelength ranges, and the getting section may get a video signal representing the first moving picture falling within the first wavelength range and a video signal representing the first moving picture falling within the second wavelength range.

In one embodiment, the getting section may get a video signal representing the first moving picture in the color green, a video signal representing the second moving picture in the color green, a video signal representing the third moving picture in the color red, and a video signal representing the fourth moving picture in the color blue.

In one embodiment, the getting section may get a video signal representing the first moving picture in the color green, a video signal, representing the second moving picture comprised of red, green and blue components, a video signal representing the third moving picture in the color red, and a video signal representing the fourth moving picture in the color blue.

In one embodiment, the processing section may generate pixels that form multiple frames of the new moving picture representing the first, third and fourth color components based on pixels that form part of multiple frames of the first moving picture, a pixel that forms part of one frame of the second moving picture, a pixel that forms part of one frame of the third moving picture, and a pixel that forms part of one frame of the fourth moving picture, the pixels of the first, second, third and fourth moving pictures having been captured using four adjacent pixels on the single-chip color image sensor.

In one embodiment, the new picture generated by the processing section may have a smaller number of pixels than the single-chip color image sensor.

In one embodiment, the number of pixels of the new picture generated by the processing section may be smaller than the sum of the respective numbers of pixels of the first and second moving pictures.

In one embodiment, the respective color components of the first and second moving pictures may include the same color component, and the image capturing section may shoot in the same exposure period as for pixels that form the same horizontal line of the single-chip color image sensor.

In another aspect of the present disclosure, an image generation system includes: an image capturing section including a single-chip color image sensor configured to detect a light ray including a first color component and a light ray including a second color component; any of the image generation device described above; and an image output section configured to output the new moving picture that has been supplied from the image generation device. The image capturing section obtains a video signal representing a first moving picture that is a moving picture that represents a first color component of the subject and a video signal representing a second moving picture that is a moving picture that represents a second color component of the subject using the single-chip color image sensor, and as the first moving picture is shot in a longer exposure time than the second moving picture, the first moving picture has a lower frame rate than the second moving picture.

In another aspect of the present disclosure, an image generation system includes: any of the image generation device described above; an image output section configured to output the new moving picture that has been supplied from the image generation device; and a display device configured to display the new moving picture that has been output from the image output section.

In one embodiment, the image generation device may get the video signals representing the first and second moving pictures via at least one of a memory card, an antenna and a network.

In another aspect of the present disclosure, an image generation device generates a new moving picture of a subject based on first and second moving pictures that represent first and second color components of the subject, respectively and that have been shot with a single-chip color image sensor, which detects a light ray including the first color component and a light ray including the second color component. As the first moving picture has been shot in a longer exposure time than the second moving picture, the first moving picture has a lower frame rate than the second moving picture. The image generation device includes: a getting section configured to get video signals representing the first and second moving pictures, respectively; a processing section configured to generate a new moving picture that has as high a frame rate as the second moving picture based on the respective video signals representing the first and second moving pictures that have been gotten; and an output section configured to output the new moving picture. The processing section generates a moving picture that satisfy all of first, second and third conditions, the first condition being that the total temporal quantities of light agree with each other between two corresponding pixel locations in the first moving picture and a moving picture representing the first color component that is included in the new moving picture, the second condition being that the total spatial quantities of light agree with each other between the two corresponding pixel locations, the third condition being imposed on color continuity between adjacent pixels.

In one embodiment, the processing section may set a first condition that the total quantity of light at respective pixel locations of the first moving picture for one frame agree with the total quantity of light of multiple frames of the new moving picture corresponding to one frame period of the first moving picture.

In one embodiment, the image generation device may further includes a motion detection section configured to detect the motion of the subject in the second moving picture and outputs a result of the detection as a motion vector. By further using the result of the detection obtained by the motion detection section, the processing section sets a fourth condition that pixel values in the new moving picture agree with each other along the motion vector and generates a moving picture that satisfies all of the first through fourth conditions.

In one embodiment, the respective color components of the first and second moving pictures may include the same color component, and the image capturing section may shoot in the same exposure period as for pixels that form the same horizontal line of the single-chip color image sensor.

In one embodiment, the image capturing section may output a video signal representing a third moving picture which has a third color component that is different from the second color component of the second moving picture and which has been shot at the same frame rate as the second moving picture but at a different exposure timing from the second moving picture.

In another aspect of the present disclosure, an image generation system includes: an image capturing section including a single-chip color image sensor configured to detect a light ray including a first color component and a light ray including a second color component; any of the image generation device described above; and an image output section configured to output the new moving picture that has been supplied from the image generation device. The image capturing section obtains a video signal representing a first moving picture that is a moving picture that represents a first color component of the subject and a video signal representing a second moving picture that is a moving picture that represents a second color component of the subject using the single-chip color image sensor, and as the first moving picture is shot in a longer exposure time than the second moving picture, the first moving picture has a lower frame rate than the second moving picture.

In another aspect of the present disclosure, an image generation system includes: any of the image generation device described above; an image output section configured to output the new moving picture that has been supplied from the image generation device; and a display device configured to display the new moving picture that has been output from the image output section.

In one embodiment, the image generation device may get the video signals representing the first and second moving pictures via at least one of a memory card, an antenna and a network.

In another aspect of the present disclosure, described is an image generating method for generating a new moving picture of a subject based on first, second, third and fourth moving pictures that represent first, second, third and fourth color components of the subject, respectively, and that have been shot with a single-chip color image sensor, which detects light rays including the first, second, third and fourth color components, respectively. The first and second color components are the same color component, and the third and fourth color components are not only different from the first and second color components but also different from each other. As the first moving picture has been shot in a longer exposure time than the second moving picture, the first moving picture has a lower frame rate than the second moving picture. The third and fourth moving pictures have as high a frame rate as the second moving picture. Each of three video signals respectively representing the second, third and fourth moving pictures includes an identification header, containing information about a time lag between exposure timings, and moving picture data. The method includes the steps of: getting the video signals representing the first, second, third and fourth moving pictures, respectively, at least the video signals representing the second and third moving pictures being gotten at different timings; generating a new moving picture that has as high a frame rate as the second moving picture based on the respective video signals representing the first, second, third and fourth moving pictures that have been gotten; and outputting the new moving picture.

In another aspect of the present disclosure, described is a method for generating a new moving picture of a subject based on first and second moving pictures that represent first and second color components of the subject, respectively, and that have been shot with a single-chip color image sensor, which detects a light ray including the first color component and a light ray including the second color component. As the first moving picture has been shot in a longer exposure time than the second moving picture, the first moving picture has a lower frame rate than the second moving picture. The method includes the steps of: getting video signals representing the first and second moving pictures, respectively; generating a new moving picture which has as high a frame rate as the second moving picture based on the respective video signals representing the first and second moving pictures that have been gotten and which satisfies all of first, second and third conditions, the first condition being that the total temporal quantities of light agree with each other between two corresponding pixel locations in the first moving picture and a moving picture representing the first color component that is included in the new moving picture, the second condition being that the total spatial quantities of light agree with each other between the two corresponding pixel locations, the third condition being imposed on color continuity between adjacent pixels; and outputting the new moving picture.

In another aspect of the present disclosure, a computer program is executed by a computer that is built in an image generation device. By executing the computer program, the image generation device generates a new moving picture of a subject based on first, second, third and fourth moving pictures that represent first, second, third and fourth color components of the subject, respectively, and that have been shot with a single-chip color image sensor, which detects light rays including the first, second, third and fourth color components, respectively. The first and second color components are the same color component. The third and fourth color components are not only different from the first and second color components but also different from each other. As the first moving picture has been shot in a longer exposure time than the second moving picture, the first moving picture has a lower frame rate than the second moving picture. The third and fourth moving pictures have as high a frame rate as the second moving picture. Each of three video signals respectively representing the second, third and fourth moving pictures includes an identification header, containing information about a time lag between exposure timings, and moving picture data. The computer program is defined so as to make the computer built in the image generation device perform the steps of: getting the video signals representing the first, second, third and fourth moving pictures, respectively, at least the video signals representing the second and third moving pictures being gotten at different timings; generating a new moving picture that has as high frame rate as the second moving picture based on the respective video signals representing the first, second, third and fourth moving pictures that have been gotten; and outputting the new moving picture.

In another aspect of the present disclosure, a computer program is executed by a computer that is built in an image generation device. By executing the computer program, the image generation device generates a new moving picture of a subject based on first and second moving pictures that represent first and second color components of the subject, respectively, and that have been shot with a single-chip color image sensor, which detects a light ray including the first color component and a light ray including the second color component. As the first moving picture has been shot in a longer exposure time than the second moving picture, the first moving picture has a lower frame rate than the second moving picture. The computer program is defined so as to make the computer built in the image generation device perform the steps of: getting video signals representing the first and second moving pictures, respectively; generating a new moving picture which has as high a frame rate as the second moving picture based on the respective video signals representing the first and second moving pictures that have been gotten and which satisfies all of first, second and third conditions, the first condition being that the total temporal quantities of light agree with each other between two corresponding pixel locations in the first moving picture and a moving picture representing the first color component that is included in the new moving picture, the second condition being that the total spatial quantities of light agree with each other between the two corresponding pixel locations, the third condition being imposed on color continuity between adjacent pixels; and outputting the new moving picture.

According to the one aspect of the image generation device of the present disclosure, the device uses a single-chip input image, which has a larger number of pixels (i.e., has a higher density) than an output image and which has been shot with a single-chip color image sensor. The input image is comprised of pixels that have been subjected to a long exposure process and pixels that have been subjected to a short exposure process at a high frame rate. The pixel values of an output image are generated based on the values of long exposure pixels and short exposure, high frame rate pixels at corresponding locations. By adopting such a configuration, the color resolution of the output image can be increased and even an image that has been generated based on high density pixels captured can also have increased sensitivity by being exposed to a sufficient quantity of light through the long exposure process. Information about those long exposure pixels can have its frame rate increased by reference to information about short exposure, high frame rate pixels. As a result, an image of quality can be obtained with the color resolution and sensitivity of the generated image both increased.

Hereinafter, embodiments of an image generation device according to the present disclosure will be described with reference to the accompanying drawings.

(Embodiment 1)

Figure 1:
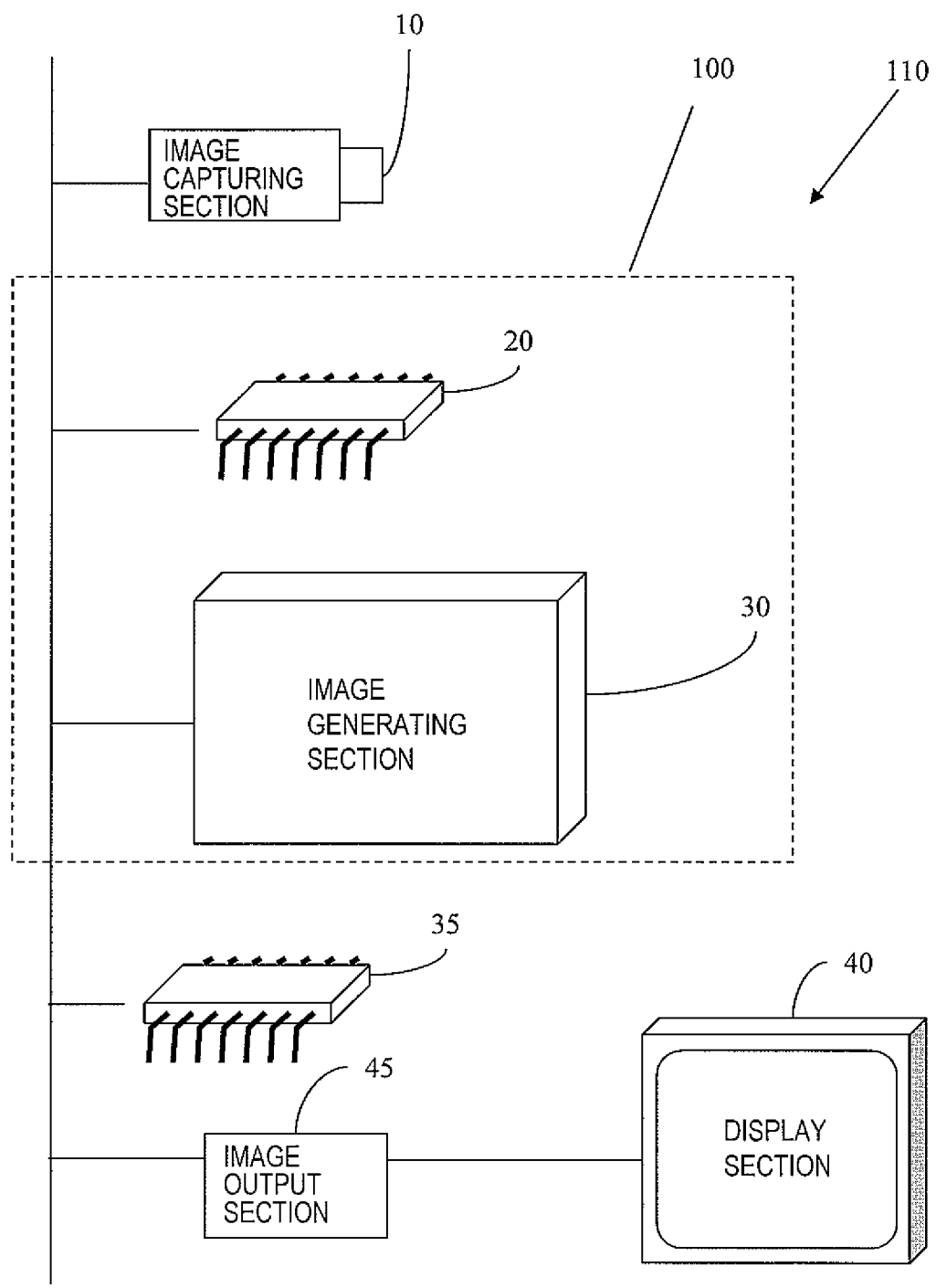
FIG. 1 illustrates a configuration for an image generation device 100 as a first embodiment and a configuration for an image generation system 110 including the image generation device 100.

FIG. 1 illustrates a configuration for an image generation device 100 as an embodiment of the present disclosure and a configuration for an image generation system 110 including the image generation device 100. The image generation system 110 may be a camcorder, for example. The image generation device 100 generates a new moving picture based on the data of multiple moving pictures that have been generated by shooting the same object (or subject) in multiple different exposure times and at different frame rates.

In this embodiment, a long exposure, low frame rate moving picture and a short exposure, high frame rate moving picture are shot using a single-chip color image sensor. And based on the pixels of the long exposure, low frame rate moving picture and the pixels of the short exposure, high frame rate moving picture, the image generation device 100 generates a new moving picture. In this case, the new moving picture is a color moving picture with a high color resolution and a high frame rate.

The image generation system 110 includes an image capturing section 10, the image generation device 100, an output image storage section 35, an image output section 45 and a display section 40.

The image capturing section 10 may be an image capturing system including a camcorder's optical system, for example, and shoots the same subject using a single-chip color image sensor with multiple groups of pixels to be used under mutually different shooting conditions, thereby getting moving pictures with multiple different temporal resolutions. In this embodiment, the "moving pictures" with different temporal resolutions refer to (i) a short exposure, high frame rate moving picture (i.e., a moving picture, of which the temporal resolution is relatively high and the degree of exposure is relatively low) and (ii) a long exposure, law frame rate moving picture (i.e., a moving picture, of which the temporal resolution is relatively low and the degree of exposure is relatively high), both of which are obtained by shooting the same object (or subject).

The image generation device 100 includes an image storage section 20 and an image generating section 30.

The image storage section 20 may be a semiconductor memory, for example, and temporarily stores the moving picture that has been captured by the image capturing section 10.

The image generating section 30 may be an image processor (e.g., a graphic controller) which is implemented as a hardware component. The image generating section 30 retrieves the moving picture that is stored in the image storage section 20 and generates a new moving picture with an increased color resolution and an increased frame rate based on the moving picture that has been retrieved.

The image output section 45 is an output terminal for the moving picture generated, and may be a connector or a terminal to be connected to a data bus, for example.

The display section 40 may be a liquid crystal display, for example, and displays the new moving picture that has been generated by the image generating section 30.

The image generation system 110 may also be implemented differently, not just a system with a camcorder. For example, in the image generation system 110, the image generation device 100 may be a PC including a general purpose processor and software such as an image processing program, and the image capturing section 10 may be a camcorder with a single-chip image sensor. Other modified examples will be described later with reference to FIGS. 29 and 30.

Next, the image generating section 30 of the image generation device 100 will be described in detail.

Figure 2:
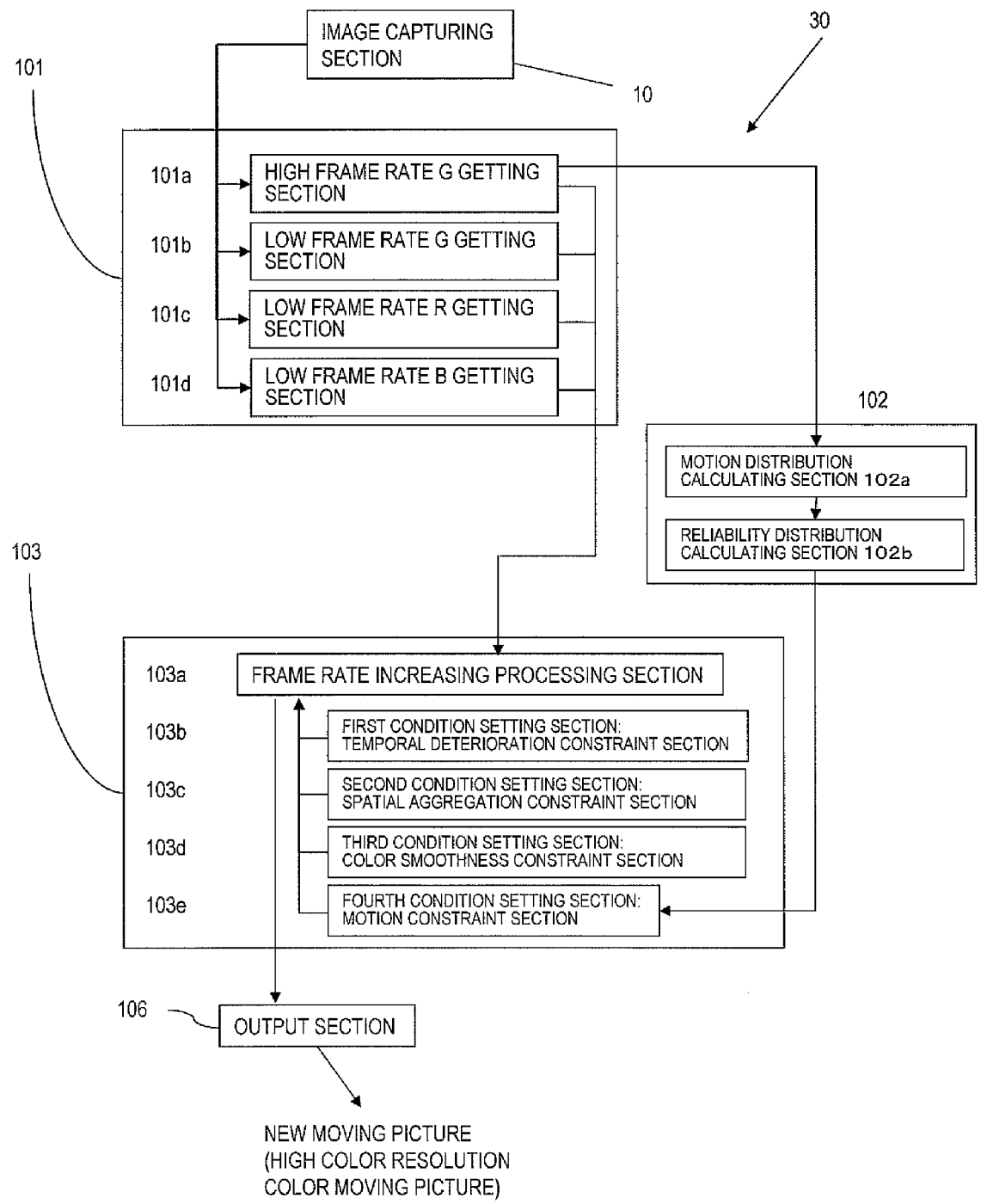
FIG. 2 illustrates an internal configuration for the image generating section 30 shown in FIG. 1.

FIG. 2 illustrates an internal configuration for the image generating section 30 shown in FIG. 1. The image generating section 30 includes a picture getting section 101, a motion detection section 102, an image processing section 103 and an output section 106.

The picture getting section 101 gets multiple moving pictures with different temporal resolutions and different colors which have been obtained by shooting the same object (or subject), and includes a high frame rate G getting section 101a, a low frame rate G getting section 101b, a low frame rate R getting section 101c and a low frame rate B getting section 101d.

The high frame rate G getting section 101a gets a high frame rate green (G) picture. The low frame rate G getting section 101b gets a low frame rate green (G) picture. The low frame rate R getting section 101c gets a low frame rate red (R) picture. And the low frame rate B getting section 101d gets a low frame rate blue (B) picture.

These pictures that have been gotten by the high frame rate G getting section 101a, low frame rate G getting section 101b, low frame rate R getting section 101c and low frame rate B getting section 101d have mutually different temporal resolutions and express respectively different colors, but are pictures obtained by shooting the same object (or subject).

In this embodiment, a high frame rate moving picture is supposed to be shot so as to express the color green. However, this is just an example. Alternatively, as long as multiple moving pictures can be shot for respective wavelength ranges of light (e.g., for the colors green, red and blue in most cases), a high frame rate moving picture may also be shot to express the color red or blue as well.

The motion detection section 102 includes a motion distribution calculating section 102a and a reliability distribution calculating section 102b. The motion detection section 102 detects the motion of a portion of the input picture, calculates the degree of reliability of the motion detection and outputs the results. Specifically, the motion distribution calculating section 102a detects the motion of a portion (which typically represents the subject) of the picture that has been gotten based on the input picture in the picture getting section 101. The motion detection is eventually performed on the entire picture of each frame. The reliability distribution calculating section 102b calculates the degree of reliability of the motion detection that has been performed by the motion detection section 102a over the entire picture of each frame. It will be described later specifically how the reliability distribution calculating section 102b works.

The image processing section 103 generates a color moving picture with a high color resolution and a high frame rate based on the multiple moving pictures that have been gotten by the picture getting section 101.

Specifically, the image processing section 103 includes a frame rate increasing processing section 103a, a first condition setting section 103b, a second condition setting section 103c, a third condition setting section 103d and a fourth condition setting section 103e. The first through fourth condition setting sections define the relation between (i.e., set the conditions to be satisfied by) the moving pictures gotten and the moving picture to be newly generated.

In this description, the moving picture to be newly generated will be sometimes referred to herein as a "target moving picture". The "target moving picture" is a color moving picture. In the following context, however, the "target moving picture" may refer to just one frame picture that forms part of a moving picture.

The first condition setting section 103b defines a temporal relation between the pixel values of the target moving picture and those of the moving pictures gotten (i.e., sets a condition on temporal deterioration of the target moving picture with respect to the moving pictures gotten). The second condition setting section 103c defines a spatial relation between the pixel value of the target moving picture and those of the moving pictures gotten (i.e., sets a condition on spatial aggregation of the moving pictures gotten into the target moving picture). The third condition setting section 103d sets a spatial constraint condition on the target moving picture.

And the fourth condition setting section 103e sets a constraint condition on the target moving picture based on the motion and the degree of reliability of motion detection (to be described later) that have been obtained from the motion detection section 102.

The frame rate increasing processing section 103a sets an evaluation function which uses, as variables, the moving pictures on which the conditions set by the first through fourth condition setting sections 103b through 103e are imposed, and obtains a picture that makes as small as possible (and hopefully minimizes) the value of that function, thereby generating moving pictures $R_O$, $G_O$ and $B_O$ in respective colors to form the target moving picture. A moving picture that has been generated in this manner is output as a target moving picture.

The output section 106 is the output terminal of this image generating section 30. If the image generating section 30 is an image processor (such as a graphic controller), the output section 106 is a connector to be connected to a bus. The output section 106 outputs the data of the color image that has been generated by the image processing section 103 to an external device (e.g., to the display section 40).

It should be noted that in this description, the "frame" refers to not only a frame according to the progressive scanning method but also an even numbered field and an odd numbered field according to the interlaced scanning method as well.

Figure 3:
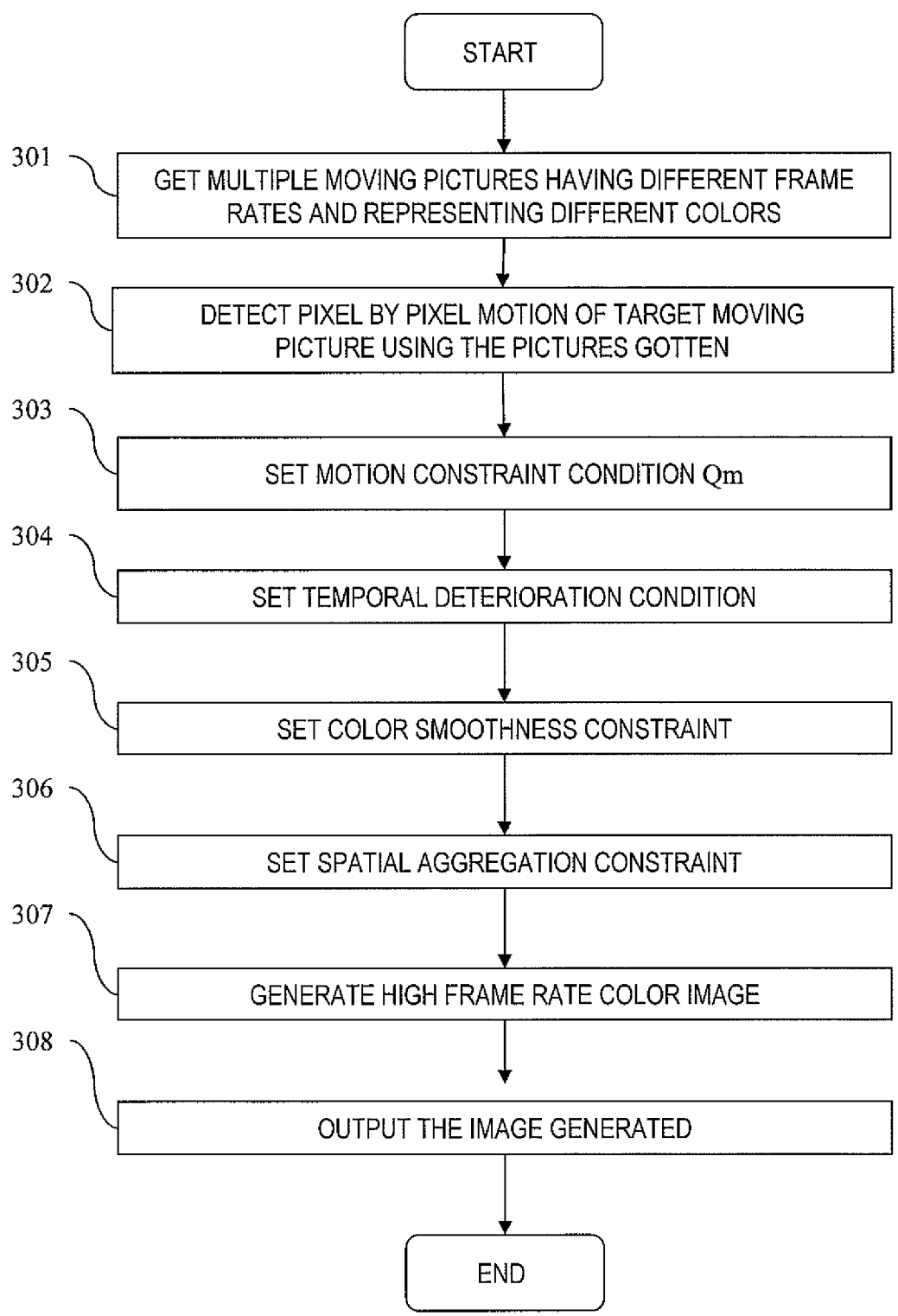
FIG. 3 is a flowchart showing the procedure of the processing to be performed by the image generation device 30.

Next, it will be described what processing the image generating section 30 with such a configuration carries out. FIG. 3 shows the procedure of the processing to be performed by the image generation device 30.

First, in Step 301, the picture getting section 101 gets multiple moving pictures with mutually different exposure times, frame rates and colors. Specifically, the high frame rate G getting section 101a gets a G moving picture with a high frame rate. The low frame rate G getting section 101b gets a G moving picture with a low frame rate with respect to the same object (or subject). The low frame rate R getting section 101c gets an R moving picture with a low frame rate with respect to the same subject. And the low frame rate B getting section 101d gets a B moving picture with a low frame rate with respect to the same subject.

Figure 4A:
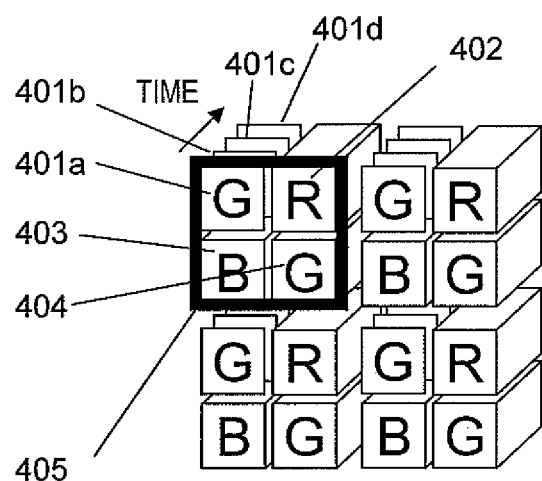
FIG. 4A schematically illustrates moving pictures gotten by the picture getting section 101.
Figure 4B:
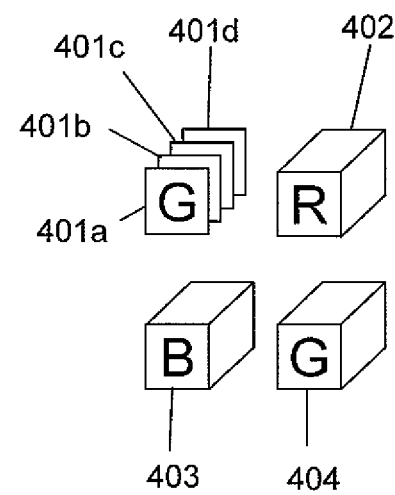
FIG. 4B separately illustrates only the pixels enclosed in the square 405 with the bold outline shown in FIG. 4A so that those pixels can be seen easily.
Figure 4C:
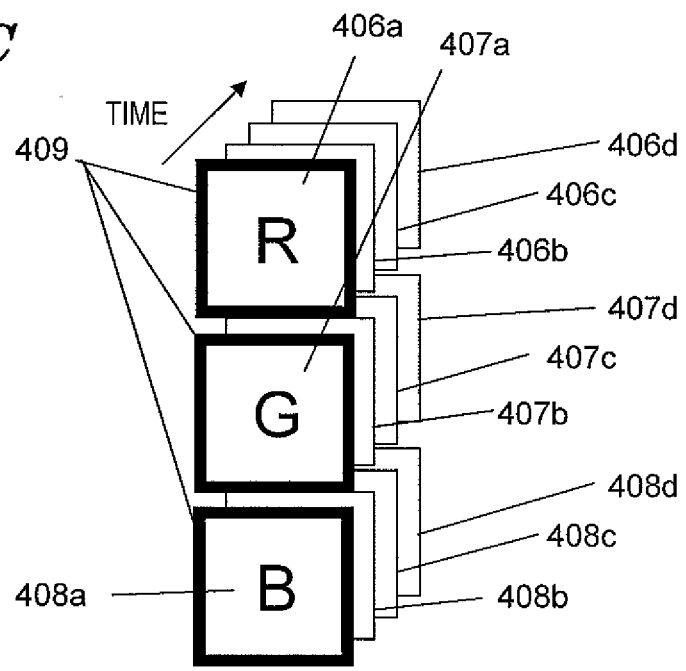
FIG. 4C illustrates a high frame rate color moving picture generated by the image processing section 103.

FIG. 4A schematically illustrates moving pictures gotten by the picture getting section 101. FIG. 4B separately illustrates only the pixels enclosed in the square 405 with the bold outline shown in FIG. 4A so that those pixels can be seen easily. FIG. 4C illustrates a high frame rate color moving picture generated by the image processing section 103. In FIGS. 4A and 4C, the frame pictures of those two kinds of moving pictures are illustrated sequentially in the order of the times generated. That is to say, the direction coming out of the paper on which FIGS. 4A and 4C are drawn indicates the time axis and the thickness of each pixel as measured in the depth direction indicates the exposure time of that pixel. Also, in FIGS. 4A and 4C, the difference in spatial resolution is represented by the sizes and densities of the rectangles.

Specifically, in FIGS. 4A and 4C, the squares 405 and 409 with the bold outline indicate the areas in which multiple ranges of the same size are displayed. In FIG. 4A, four pixels are arranged within the range covered by that square 405. In FIG. 4C, on the other hand, one pixel is arranged in each of those square areas 409. That is to say, the pixel arrangement shown in FIG. 4A has one quarter as large a pixel area as, and four times as high a pixel density as, the counterpart shown in FIG. 4C.

The G pixels 401a through 401d belong to four frames of the high frame rate G moving picture gotten by the high frame rate G getting section 101a. The R pixel 402 belongs to one frame of the low frame rate R moving picture gotten by the low frame rate R getting section 101c. The B pixel 403 belongs to one frame of the low frame rate B moving picture gotten by the low frame rate B getting section 101d. And the G pixel 404 belongs to one frame of the low frame rate G moving picture gotten by the low frame rate G getting section 101b.

The exposure time of the low frame rate pictures 402, 403 and 404 shown in FIG. 4A is as long as the combined exposure time in four frames of the G pixels 401a through 401d.

The three square areas 409 shown in FIG. 4C respectively indicate high frame rate R, G and B moving pictures, each of which is obtained by shooting the same range as the square area indicated by the bold square 405 shown in FIG. 4A. In FIG. 4C, the R pictures 406a through 406d have frame periods corresponding to those of the G pixels 401a through 401d falling within the same range as the square 405.

In the same way, the G pictures 407a through 407d and the B pictures 408a through 408d each have frame periods corresponding to those of the G pixels 401a through 401d falling within the same range as the square 405.

According to this embodiment, the image processing section 103 uses the pixels 401a through 401d of the high frame rate G moving picture that has been gotten in the range indicated by the square 405 in FIG. 4A and the R, B and G pixels 402, 403 and 404 of the low frame rate pictures to generate the pixels 406a through 406d of the high frame rate R moving picture, the pixels 407a through 407d of the G moving picture, and the pixels 408a through 408d of the B moving picture, respectively, as shown in FIG. 4C.

In this manner, according to the present disclosure, single-chip RGB pictures that have a higher density than the picture to generate are gotten at each pixel location of the RGB moving picture to generate, thereby increasing the color resolution. In this case, to compensate for a decrease in the quantity of light received due to the increase in the density of pixels, the target picture is generated based on pictures that have had their sensitivity raised by increasing the degree of exposure through a shooting operation with a longer exposure process than the frame interval of the target picture to be generate. As a result, a color moving picture can be obtained with the color resolution and sensitivity both increased.

Figure 5:
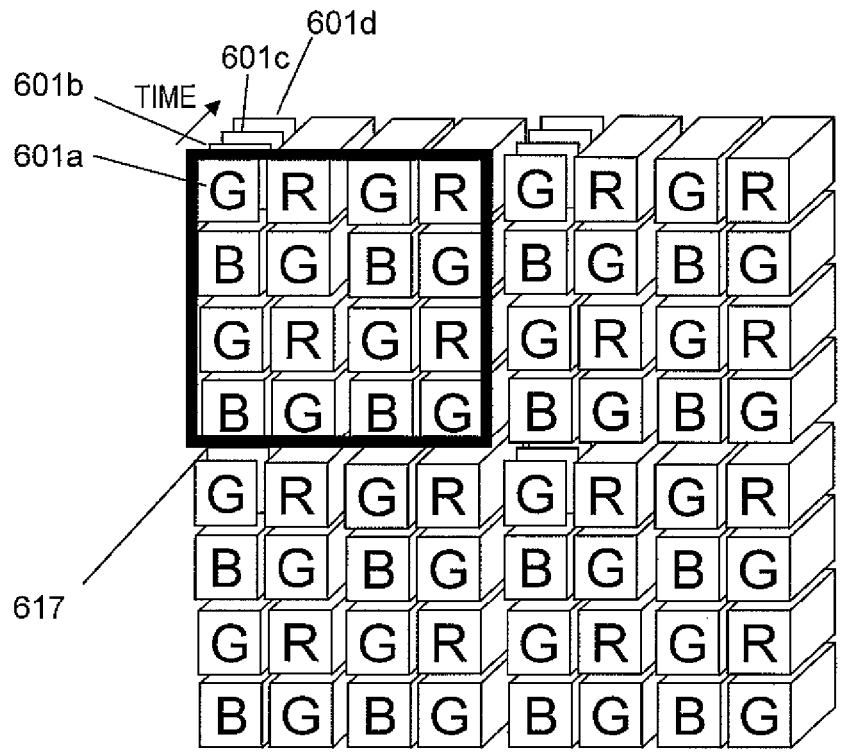
FIG. 5 illustrates a square area 617 consisting of sixteen pixels and corresponding to one pixel area of the moving picture to generate.

It should be noted that the color arrangement does not always have to be obtained by the picture getting section 101 as described above but the RGB pixels may have a different relative arrangement and four or more colors may be obtained as well as long as at least two different colors are included. Likewise, the number of pixels of a gotten picture corresponding to a single pixel location of the picture to generate does not have to be four as in the example described above, either. Alternatively, the pictures may also be gotten so that a square area 617 consisting of sixteen pixels, some of which are high frame rate pixels 601a through 601d as shown in FIG. 5, corresponds to one pixel area of the moving picture to generate. Optionally, the combination or number of colors may be changed from one location in the picture to generate to another.

Figure 6:
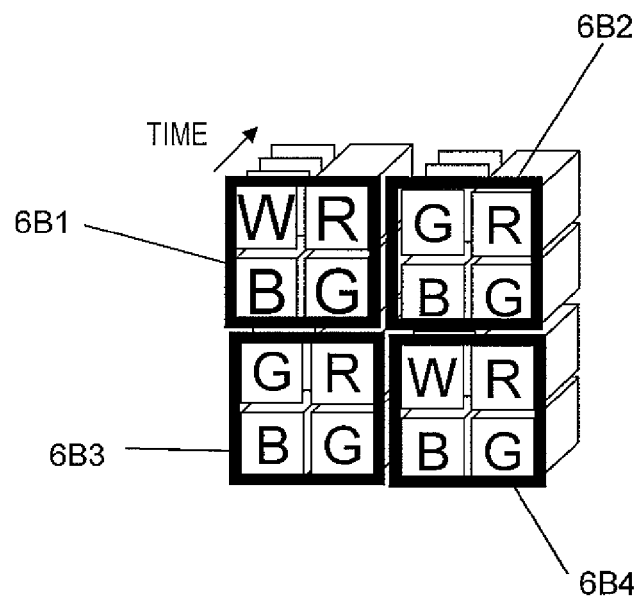
FIG. 6 illustrates bold square areas 6B1 through 6B4, each corresponding to one pixel of the picture to generate and including multiple pixel areas of the input picture.

A specific example is shown in FIG. 6, in which each of the bold square areas 6B1 through 634, corresponding to one pixel of the picture to generate, includes multiple pixel areas of the input picture. And one set of square areas 6B1 and 6B4 and the other set of square areas 6B2 and 6B3 have input picture components that consist of mutually different numbers and combinations of colors. In particular, each of square areas 6B1 and 6B4 includes a "W" pixel, the pixel value of which includes the color components of the incoming light as they are. That is to say, the pixel value of this pixel includes respective color components of RGB.

By imparting different color properties to different square areas in this manner, information about various colors and brightness levels, which could not be obtained only with the color property of a single square area, can be obtained from multiple angles. As a result, a greater number of illumination conditions and subjects can be dealt with.

As for the timings to shoot RGB pictures to be gotten by the picture getting section 101, as long as the relative order of those timings is known, the exposure process does not always have to be started or ended at the same time. That is to say, their image capturing timings may have mutually different time phases.

Figure 7:
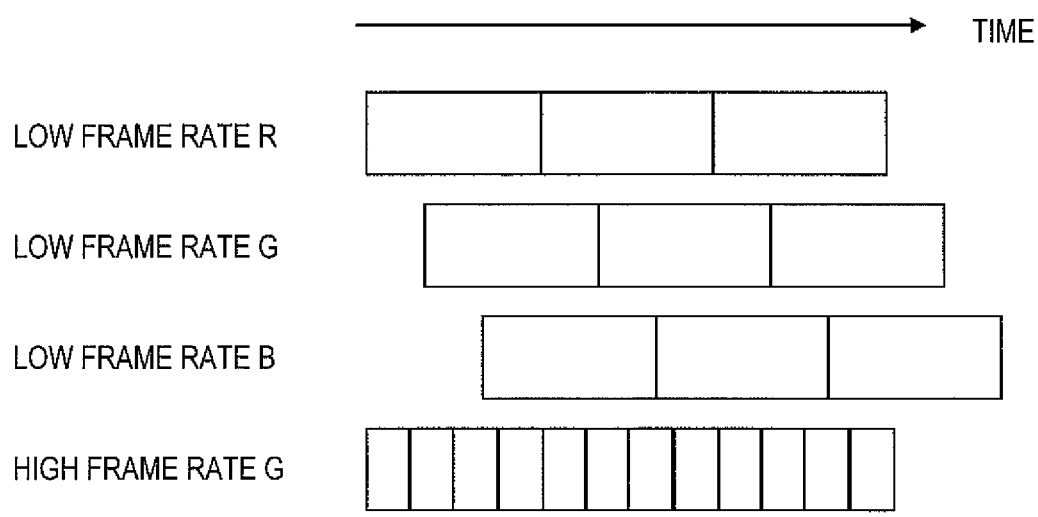
FIG. 7 shows the exposure timings of the long exposure, low frame rate R, G and B pixels.

Specifically, the exposure timings of the long exposure, low frame rate R, G and B pixels may be set as shown in FIG. 7, in which the abscissa represents the time, the rectangles indicate frames of each of those pixels, and the lateral width of each rectangle represents the length of the exposure time. In FIG. 7, the exposure timings of the low frame rate R, G and B pixels are not the same, but are slightly shifted from each other at regular intervals, with respect to the given pixels with the arrangement shown in FIG. 4B. In this case, the exposure timings may be shifted in an arbitrary manner, e.g., by the amount of time corresponding to one frame period of the high frame rate moving picture (G).

If the exposure timings are shifted in this manner, then the low frame rate G, R and B getting sections 101b, 101c and 101d of the picture getting section 101 shown in FIG. 2 may also get the respective input signals at such shifted timings, too.

Figure 8:
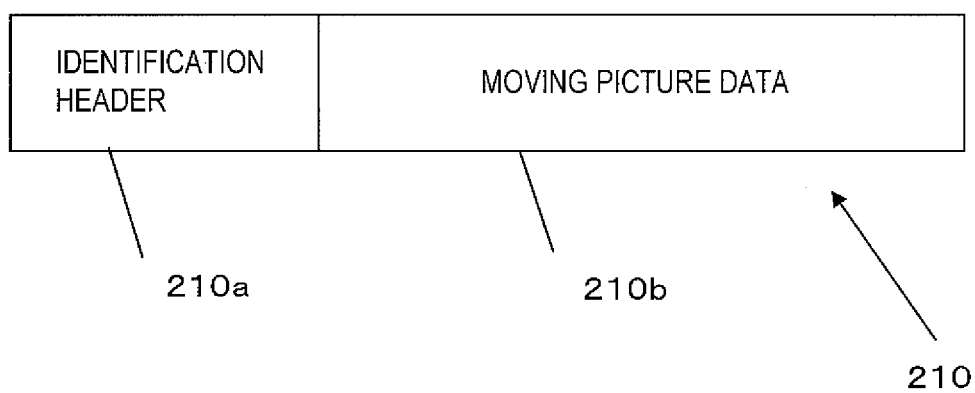
FIG. 8 shows an exemplary format for a video signal 210 including an identification header 210a in which information about the shooting condition is described and moving picture data 210b.

If the long exposure, low frame rate R, G and B pictures are shot at the exposure timings shown in FIG. 7, a scheme that enables the image capturing section 10 to notify the image generating section 30 of those exposure timings is needed. For that purpose, a shooting condition may be applied to the video signal to send. FIG. 8 shows an exemplary format for a video signal 210 including an identification header 210a in which information about the shooting condition is described and moving picture data 210b.

The image capturing section 10 stores information about the shooting condition in the identification header 210a and outputs a video signal 210 in which the identification header 210a is added to the moving picture data 210a obtained.

The picture getting section 101 of the image generating section 30 receives the video signal 210 and reads the identification header 210a first, thereby getting information about the shooting condition. Next, based on the shooting condition, the picture getting section 101 gets the moving picture data 210b. Meanwhile, the image processing section 103 sets the first and second conditions (i.e., the condition on temporal deterioration and the constraint condition on spatial integration) based on the shooting condition specified by the identification header 210a.

The information about the picture shooting condition to be stored in the identification header 210a includes color-by-color (RGB) and respective pixel locations' exposure times and frame rates, the relative time difference (i.e., time phase difference) between the respective exposure timings of the RGB pixels, and their associated numerical values and signs.

If the picture getting section 101 receives a digital signal, the identification header 210a is digital data. That is why the respective values of the exposure times, frame rates and relative time difference in exposure timing between the RGB pixels, specifying the shooting condition, may be directly represented as digital values. Alternatively, the voltage, electrical charge and current values (which are analog values) in the associated image sensor may be rounded to a predetermined number of effective digits and those values may be represented as digital values.

On the other hand, if the picture getting section 101 receives an analog video signal, that information is represented as either those analog values including voltage, electrical charge, and current values in the image sensor or their associated numerical values or signs.

By changing the exposure start and end times from one pixel to another in this manner, the timings of reading pixel values from the image sensor can be shifted from each other and the signal line transmission efficiency can be increased. In addition, if those pieces of information that have been obtained with the exposure start and end times changed from one pixel to another in this manner are collected together to generate a new picture, a moving picture with a high temporal resolution can be obtained.

The pictures to be gotten by the picture getting section 101 can be shot by a single-chip image sensor with an RGB color filter arrangement. Portions (a) and (b) of FIG. 9 illustrate a configuration for a single-chip image sensor 701 with an RGB color filter arrangement. Portion (b) of FIG. 9 illustrates the color filter arrangement as viewed in the light incoming direction. By using this single-chip image sensor 701, pictures can be shot with the frame rates and exposure times changed from one pixel location to another, and an equivalent picture can be generated based on those pictures.

It should be noted that the single-chip image sensor 701 shown in portion (a) and (b) of FIG. 9 is only an example. Optionally, an arrangement including not only such an RGB color filter arrangement but also the "W" pixels that have already been described with reference to FIG. 6 may also be used.

Now take a look at FIG. 3 again. In Step 302, the motion detecting section 102 detects pixel-by-pixel motions of the respective pictures that form the target moving picture and calculates the degree of reliability of that motion detected. In this embodiment, the motion detection processing is carried out in the following manner. Specifically, at respective locations of each of the frame images of the moving picture that has been gotten by the high frame rate G getting section 101a, the motion detection section 102 obtains the directions and magnitudes of the subject's motion, thereby obtaining a temporal and spatial distribution conf(x, y, t) of the degrees of reliability of motion detection. In this case, the higher the degree of reliability of motion detection, the more likely the result of the motion detection. On the other hand, if the degree of reliability is low, it means that the result of the motion detection should be erroneous.

In this embodiment, the high frame rate G picture is used to detect the motion.

The reason is that motion can be detected more finely with a high frame rate picture.

Examples of the methods for getting a motion between two adjacent frame pictures detected at each location on the picture include the method adopted by P. ANANDAN in "A Computational Framework and an Algorithm for the Measurement of Visual Motion", IJCV, 2, pp. 283-310 (1989), the motion detection method that is generally used in encoding a moving picture, and a feature point tracking method for use in tracking a moving object using pictures.

Alternatively, by employing either a general method for detecting the global motion (such as the affine motion) of the entire picture or the method disclosed by Lihi Zelkik-Manor in "Multi-Body Segmentation: Revisinting Motion Consistency", ECCV (2002), the motion may also be detected on a multiple-areas-at-a-time basis and used as the motion at each pixel location.

A method for detecting a motion between two frame pictures by the block matching method will be described. FIGS. 10A and 10B illustrate arrangements of pixels in $t^{th}$ and $(t+1)^{th}$ frames, respectively, in connection with the motion detection processing. In this example, the black pixel 2401 shown in FIG. 10A is supposed to be a pixel of interest and it is determined in the following procedure what pixel of the next frame picture that pixel corresponds to (or has moved to).

First of all, a block area 2402 surrounding the pixel of interest 2401 (i.e., the shadowed area consisting of 3×3 pixels) is defined. Its block size has been determined in advance. Next, an area 2403 of the same size (i.e., 3×3 pixels) as the block area is set in the next frame picture (see FIG. 10B), and either the SSD (sum of squared differences) or the SAD (sum of absolute differences) of the pixel values of these two areas 2402 and 2403 is calculated. After that, the position of the area 2403 is changed pixel by pixel within the picture shown in FIG. 10B and the center pixel location of the area 2403 where either the SSD or the SAD becomes minimum is defined to be a pixel location (i.e., the destination of the motion vector) corresponding to the pixel 2401.

This is the result of the motion detection that has been performed on the pixel 2401. After that, a similar procedure will be carried out over and over again on every pixel shown in FIG. 10A with the pixels of interest changed. In this manner, motion detection can get done on the frame picture shown in FIG. 10A. By performing such motion detection sequentially on adjacent ones of the consecutive frame pictures, the motion of the entire moving picture can be detected.

As the method for determining the degree of reliability, the method disclosed by P. Anandan in the document cited above may be used. Or if the motion is detected by the block matching method, the value obtained by subtracting the sum of squared differences between the pixel values of two blocks representing the motion from the maximum value SSDmax of the sum of squared differences, i.e., the sum of squared difference between the pixel values of two blocks, may have its sign inverted and the value conf (x, y, t) thus obtained may be used as the degree of reliability. Also, even when the global motion detection of the picture or the area-by-area motion detection is adopted, the value conf (x, y, t) obtained by subtracting the sum of squared differences between the pixel value in an area near the starting point of motion from each pixel location and the pixel value in an area near the end point of that motion from the maximum value SSDmax of the sum of squared differences may be used as the degree of reliability.

$$Conf(x, y, t) = \qquad (1)$$
$$SSD_{max} - \sum_{i \subset blocks} \sum_{j \subset blocks} \{I(x+i, y+j, t) - I(x'+i, y'+j, t+1)\}^2$$

In Equation (1), (x', y', t+1) indicates a pixel location representing the destination of a pixel location (x, y, t) to be obtained as a result of the motion detection. In this case, (t+1) means a point in time that is one frame period later than a certain point in time t if one frame period of the high frame rate G picture is supposed to be one. I(x, y, t) indicates a pixel value of (x, y, t). Also, in Equation (1), Σ indicates an addition to be performed within a block area for use in the block matching.

Next, in Step 303 shown in FIG. 3, the motion constraint condition $Q_m$ to be satisfied by the color moving picture to be eventually generated is set by the fourth condition setting section 103e. Specifically, by reference to the distribution of motions and the distribution of degrees of reliability that have been obtained by the motion detecting section 102, the fourth condition setting section 103e sets the motion constraint condition $Q_m$ by the following Equation (2):

$$Q_m = \sum_x \sum_y \sum_t conf(x, y, t) \cdot [\{R_H(x + \qquad (2)$$
$$v_x(x, y, t), y + v_y(x, y, t), t+1) - R_H(x, y, t)\}^2 +$$
$$\{G_H(x + v_x(x, y, t), y + v_y(x, y, t), t+1) -$$
$$G_H(x, y, t)\}^2 + \{B_H(x + v_x(x, y, t),$$
$$y + v_y(x, y, t), t+1) - B_H(x, y, t)\}^2]$$

In Equation (2), $R_H$, $G_H$ and $B_H$ indicate respectively the RGB components of a color moving picture as the target moving picture and $v_x$ and $v_y$ indicate respectively the x- and y-direction components of the motion vector detected.

Also, in Equation (2), the three Σ indicate addition of x, y and t, respectively. And the motion constraint condition $Q_m$ is defined with respect to the target moving picture as a result. Equation (2) defines a motion constraint condition $Q_m$ that the more uniform temporally the values of pixels representing the respective colors in associated pixels on the target moving picture (i.e., the more continuous temporally their pixel values) along the motion that has been detected on the moving picture gotten, the smaller the values. In Equation (2), the variation in pixel value is used while being weighted with the degree of reliability of the motion detection.

If the motion is detected using a low resolution picture, the motion vector cannot be obtained with respect to every pixel location of a high resolution picture. In that case, the motion vector can be obtained by making an interpolation with a motion vector that has been defined spatially in the vicinity of the pixel location. The interpolation itself can be performed by an ordinary method such as the bilinear method or the bicubic method.

A decreased value of the motion constraint condition $Q_m$ means that the pixel values of pixels of the target moving picture are continuous along the motion that has been detected on the moving picture obtained. For example, if the same subject is moving in a moving picture, the pixel values of pixels representing that subject should be substantially the same and there should be a little variation in pixel value, no matter where the subject is located or how much the subject is moving. For that reason, a target moving picture obtained by imposing the condition that the pixel values of pixels should be continuous along the motion would cause little problem as far as the subject's motion is concerned.

It should be noted that to decrease the value of the motion constraint condition $Q_m$ does not mean in this embodiment setting Q that satisfies $Q_m \leq Q$. As will be described later, according to this embodiment, an evaluation function J that includes a plurality of constraint conditions is set and a moving picture that minimizes that evaluation function J is output as the target moving picture (i.e., as a new moving picture). A moving picture that minimizes such an evaluation function J would satisfy well the condition of decreasing the values of respective constraint conditions as a whole. Following such estimation, according to this embodiment, it is determined that the respective constraint conditions have been decreased as much as possible. It should be noted that even though various constraint conditions will be described in the following description, none of those constraint conditions require setting values to be satisfied individually.

Next, in Step 304, the first condition setting section 103b sets the temporal deterioration constraint condition. The following Equations (3) through (5) indicate examples of those constraint conditions:

$$|H_R R_H - R_L|^2 \qquad (3)$$

$$|H_G G_H - G_L|^2 \qquad (4)$$

$$|H_B B_H - B_L|^2 \qquad (5)$$

In Equations (3) to (5), $R_H$, $G_H$ and $B_H$ indicate the RGB values of virtual pixels corresponding to respective frames of the target moving picture (i.e., a high resolution moving picture) at the respective locations of pixels that have been gotten by the picture getting section. $H_R$, $H_G$ and $H_B$ indicate operators for transforming a high resolution moving picture with such RGB values into the pictures gotten. In this example, $H_R$, $H_G$ and $H_B$ are operators for performing the low frame rate transformation. On the other hand, $R_L$, $G_L$ and $B_L$ respectively indicate the long exposure R, G and B pictures that have been gotten. The more closely the pictures that have been obtained by subjecting the virtual pixel values to a deterioration transformation with their frame rates decreased and the pictures gotten match each other, the smaller the values of these Equations (3) to (5). It should be noted that none of these Equations (3) to (5) cover transformation of the spatial resolution.

For example, the transformation into a long exposure, low frame rate picture can be represented by the following Equation (6):

$$LH(x, y, t_L) = \sum_{t=0}^{3} HH(x, y, t) \qquad (6)$$

In Equation (6), the pixel values at a pixel location (x, y, tL) of the low frame rate picture are represented by LH (x, y, tL) and the pixel values at a pixel location (x, y, t) of the high frame rate picture are represented by HH (x, y, t). The equal sign in Equation (6) means that the total quantities of light are equal to each other between the pixels on the left and right sides. That is to say, it means that at each pixel location, the total quantity of light for one frame of the low frame rate picture is equal to the total quantity of light of multiple frames of the new moving picture with a high frame rate. In this case, the "multiple frames" means the number of frames of the new moving picture to be displayed in one frame period of the low frame rate picture. In this embodiment, the multiple frames are four frames. Such a relation in the total quantity of light indicated by this Equation (6) is satisfied on a color component basis.

It should be noted that the high frame rate pixels gotten by the high frame rate G getting section 101a have as high a frame rate as the virtual pixels, and therefore, the transformation from a picture represented by those virtual pixels into the gotten picture becomes an identity transformation.

Next, in Step 305, the third condition setting section 103d sets a spatial constraint condition with respect to the target moving picture generated. The following Equations (7) and (8) are examples $Q_{s1}$ and $Q_{s2}$ of such spatial constraint conditions:

$$Q_{s1} = \sum_x \sum_y \sum_t [\lambda_\theta(x, y, t) \cdot \{4 \cdot \theta_H(x, y, t) - \theta_H(x, y-1, t) - \theta_H(x, y+1, t) - \theta_H(x-1, y, t) - \theta_H(x+1, y, t)\}^2 + \lambda_\varphi(x, y, t) \cdot \{4 \cdot \varphi_H(x, y, t) - \varphi_H(x, y-1, t) - \varphi_H(x, y+1, t) - \varphi_H(x-1, y, t) - \varphi_H(x+1, y, t)\}^2 + \lambda_r(x, y, t) \cdot \{4 \cdot r_H(x, y, t) - r_H(x, y-1, t) - r_H(x, y+1, t) - r_H(x-1, y, t) - r_H(x+1, y, t)\}^2] \qquad (7)$$

$$Q_{s2} = \sum_x \sum_y \sum_t [\lambda_{C1}(x, y, t) \cdot \{4 \cdot C_1(x, y, t) - C_1(x, y-1, t) - C_1(x, y+1, t) - C_1(x-1, y, t) - C_1(x+1, y, t)\}^2 + \lambda_{C2}(x, y, t) \cdot \{4 \cdot C_2(x, y, t) - C_2(x, y-1, t) - C_2(x, y+1, t) - C_2(x-1, y, t) - C_2(x+1, y, t)\}^2 + \lambda_{C3}(x, y, t) \cdot \{4 \cdot C_3(x, y, t) - C_3(x, y-1, t) - C_3(x, y+1, t) - C_3(x-1, y, t) - C_3(x+1, y, t)\}^2] \qquad (8)$$

In Equation (7), $\theta_H(x, y)$, $\psi_H(x, y)$ and $r_H(x, y)$ are coordinates when a position in a three-dimensional orthogonal color space (i.e., a so-called "RGB color space") that is represented by RGB pixel values at a pixel location (x, y) on the target moving picture is represented by a spherical coordinate system ($\theta$, $\psi$, r) corresponding to the RGB color space. In this case, $\theta_H(x, y)$ and $\psi_H(x, y)$ represent two kinds of arguments and $r_H(x, y)$ represents the radius.

FIG. 11 illustrates an exemplary correspondence between the RGB color space and the spherical coordinate system ($\theta$, $\psi$, r). In the example illustrated in FIG. 11, the direction in which $\theta=0$ degrees is supposed to be positive R-axis direction in the RGB color space, and the direction in which $\theta=0$ degrees is supposed to be positive G-axis direction in the RGB color space. However, the reference directions of the arguments do not have to be the ones shown in FIG. 11 but may also be any other directions. In accordance with such correspondence, red, green and blue pixel values, which are coordinates in the RGB color space, are converted into coordinates in the spherical coordinate system ($\theta$, $\psi$, r).

Suppose the pixel value of each pixel of the target moving picture is represented by a three-dimensional vector in the RGB color space. In that case, if the three-dimensional vector is represented by the spherical coordinate system ($\theta$, $\psi$, r) that is associated with the RGB color space, then the r-axis coordinate representing the magnitude of the vector corresponding to the brightness (which is synonymous with the signal intensity and the luminance) of the pixel and $\theta$-axis and $\psi$-axis coordinate values defining the directions of vectors representing the color (i.e., color information including the hue, color difference and color saturation) of the pixel can be dealt with independently of each other. In a natural image, the temporal and spatial variations in brightness and color are quite different from each other. That is why by choosing coordinates where those values can be estimated and adjusted independently of each other, the image quality of the target moving picture can be improved.

Equation (7) defines the sum of squared second-order differences in the xy space direction between pixel values that are represented by the spherical coordinate system of the target moving picture. Equation (7) also defines a condition $Q_{s1}$ on which the more uniformly the spherical coordinate system pixel values, which are associated with spatially adjacent pixels in the target moving picture, vary, the smaller their values become. Generally speaking, if pixel values vary uniformly, then it means that the colors of those pixels are continuous with each other.

Also, if the condition $Q_{s1}$ should have a small value, then it means that the colors of spatially adjacent pixels in the target moving picture should be continuous with each other.

In a picture, the variation in the brightness of a pixel and the variation in the color of that pixel may be caused by two physically different events. That is why by separately setting a condition on the continuity of a pixel's brightness (i.e., the degree of uniformity of the variation in r-axis coordinate value) as in the third term in the bracket of Equation (7) and a condition on the continuity of the pixel's color (i.e., the degree of uniformity in the variations in $\theta$- and $\psi$-axis coordinate values) using $\lambda_\theta$, $\lambda_\psi$, and $\lambda_r$ as in the first and second terms in the bracket of Equation (7), the target image quality can be achieved more easily.

$\lambda_\theta(x, y)$, $\lambda_\psi(x, y)$ and $\lambda_r(x, y)$ represent the weights to be applied to a pixel location (x, y) on the target moving picture with respect to the conditions that have been set with the $\theta$-, $\psi$- and r-axis coordinate values, respectively. These values are determined in advance. To simplify the computation, these weights may be set to be constant irrespective of the pixel location or the frame so that $\lambda_\theta(x, y)=\lambda_\psi(x, y)=1.0$, and $\lambda_r(x, y)=0.01$, for example.

Alternatively, these weights may be set to be relatively small in a portion of the picture where it is known in advance that pixel values should be discontinuous, for instance. For example, the weights may be lightened at positions where the picture gotten has large spatial differential values.

Optionally, pixel values can be determined to be discontinuous with each other if the absolute value of the difference or the second-order difference between the pixel values of two adjacent pixels in a frame picture of the picture gotten is equal to or greater than a particular value.

It is also recommended that the weights be set so as to expand the difference between the constraint condition on the brightness and the constraint condition on the color. For example, it would be beneficial if the weights applied to the condition on the continuity of the color of pixels were heavier than the weights applied to the condition on the continuity of the brightness of the pixels. This is because the brightness of pixels in an image tends to vary more easily (i.e., vary less uniformly) than its color when the orientation of the subject's surface (i.e., a normal to the subject's surface) changes due to the unevenness or the movement of the subject's surface.

In Equation (7), the sum of squared second-order differences in the xy space direction between the pixel values, which are represented by the spherical coordinate system on the target moving picture, is set as the condition $Q_{s1}$. Alternatively, the sum of the absolute values of the second-order differences or the sum of squared first-order differences or the sum of the absolute values of the first-order differences may also be set as that condition $Q_{s1}$.

Also, in the foregoing description, the color space condition is set using the spherical coordinate system ($\theta$, $\psi$, r) that is associated with the RGB color space. However, the coordinate system to use does not always have to be the spherical coordinate system. Rather the same effects as what has already been described can also be achieved by setting a condition on a different orthogonal coordinate system with axes of coordinates that make the brightness and color of pixels easily separable from each other.

The axes of coordinates of the different orthogonal coordinate system may be set in the directions of eigenvectors (i.e., may be the axes of eigenvectors), which are defined by analyzing the principal components (i.e., making a variance based analysis) of the RGB color space frequency distribution of pixel values that are included in the moving picture gotten or another moving picture as a reference. The eigenvectors are a pair of vectors that are perpendicular to each other and that are selected based on the magnitude of the variance. An example of the axes of eigenvectors (C1, C2, C3) in the RGB color space is shown in FIG. 12.

Next, Equation (8) will be described.

In Equation (8), $C_1(x, y)$, $C_2(x, y)$ and $C_3(x, y)$ represent rotational transformations that transform RGB color space coordinates, which are red, green and blue pixel values at a pixel location (x, y) on the target moving picture, into coordinates on the axes of $C_1$, $C_2$ and $C_3$ coordinates of the different orthogonal coordinate system.

Equation (8) defines the sum of squared second-order differences in the xy space direction between pixel values of the target moving picture that are represented by the different orthogonal coordinate system. Also, Equation (8) defines a condition $Q_{s2}$. In this case, the more uniformly the pixel values of spatially adjacent pixels in each frame picture of the target moving picture, which are represented by the different orthogonal coordinate system, vary (i.e., the more continuous those pixel values), the smaller the value of the condition $Q_{s2}$.

And if the value of the condition $Q_{s2}$ should be small, it means that the spatially adjacent pixels on the target moving picture should have continuous colors.

$\lambda_{C1}(x, y)$, $\lambda_{C2}(x, y)$ and $\lambda_{C3}(x, y)$ are weights applied to a pixel location (x, y) on the target moving picture with respect to a condition that has been set using coordinates on the $C_1$, $C_2$ and $C_3$ axes and need to be determined in advance.

If the $C_1$, $C_2$ and $C_3$ axes are axes of eigenvectors, then the $\lambda_{C1}(x, y)$, $\lambda_{C2}(x, y)$ and $\lambda_{C3}(x, y)$ values may be set along those axes of eigenvectors independently of each other. Then, the best $\lambda$ values can be set according to the variance values that are different from one axis of eigenvectors to another. Specifically, in the direction of a non-principal component, the variance should be small and the sum of squared second-order differences should decrease, and therefore, the $\lambda$ value is increased. Conversely, in the principal component direction, the $\lambda$ value is decreased.

Two conditions $Q_{s1}$ and $Q_{s2}$ have been described as examples. And the condition $Q_s$ may be any of the two conditions $Q_{s1}$ and $Q_{s2}$ described above.

For example, if the condition $Q_{s1}$ defined by Equation (7) is adopted, the spherical coordinate system ($\theta$, $\psi$, r) may be introduced. Then, the condition can be set using the coordinates on the $\theta$- and $\psi$-axes that represent color information and the coordinate on the r-axis that represents the signal intensity independently of each other. In addition, in setting the condition, appropriate weight parameters $\lambda$ can be applied to the color information and the signal intensity, respectively. As a result, a picture of quality can be generated more easily, which is beneficial.

On the other hand, if the condition $Q_{s2}$ defined by Equation (8) is adopted, then the condition is set with coordinates of a different orthogonal coordinate system that is obtained by performing a linear (or rotational) transformation on RGB color space coordinates. Consequently, the computation can be simplified, which is also advantageous.

On top of that, by defining the axes of eigenvectors as the axes of coordinates $C_1$, $C_2$ and $C_3$ of the different orthogonal coordinate system, the condition can be set using the coordinates on the axes of eigenvectors that reflect a color variation to affect an even greater number of pixels. As a result, the quality of the target moving picture obtained should improve compared to a situation where the condition is set simply by using the pixel values of the respective color components in red, green and blue.

Next, in Step 306, the second condition setting section 103c sets a spatial aggregation constraint condition. The following Equations (9) through (11) show examples of those constraint conditions:

$$|S_R R_H - R_O|^2 \quad (9)$$

$$|S_G G_H - G_O|^2 \quad (10)$$

$$|S_B B_H - B_O|^2 \quad (11)$$

In Equations (9) to (11), Ro, $G_O$ and $B_O$ represent the target moving picture and $S_B$, $S_G$ and $S_B$ represent the operators of a spatial resolution decreasing transformation from $R_H$, $G_H$, $B_H$ into the target moving picture Ro, $G_O$ and $B_O$.

The following Equation (12) shows an example of the resolution decreasing transformation S:

$$HL(x_L, y_L, t) = \sum_{x=0}^{1} \sum_{y=0}^{1} HH(x, y, t) \quad (12)$$

In Equation (12), the target moving picture is supposed to be obtained by a spatial accumulation of virtual pixel values.

In this case, the pixel value at a pixel location (x, y, t) of the moving picture yet to be subjected to the resolution decreasing transformation is represented by HH (x, y, t) and the pixel value at a pixel location (xL, yL, t) of the moving picture that has been subjected to the resolution decreasing transformation is represented by HL (xL, yL, t). The equal sign of Equation (12) indicates that the total quantities of light are equal between the pixels on the left and right sides.

Next, in Step 307, a target moving picture that satisfies the constraint conditions that have been set by the first, second, third and fourth condition setting sections 103b, 103c, 103d and 103e is generated. For that purpose, an evaluation function J consisting of those constraint conditions is defined. The following Equation (13) shows an example of J:

$$J = |H_R R_H - R_L|^2 + |H_G G_H - G_L|^2 + |H_B B_H - B_L|^2 + |S_R R_H - R_O|^2 + |S_G G_H - G_O|^2 + |S_B B_H - B_O|^2 + Qs + Qm \quad (13)$$

J is defined as a function of pictures that represent the respective colors of R, G and B (which are indicated as picture vectors $R_O$, $G_O$ and $B_O$) and that form a high frame rate color picture to generate. $H_R$, $H_G$ and $H_B$ represent the resolution decreasing transformation for transforming the respective color pictures $R_H$, $G_H$ and $B_H$ of the target moving picture into the respective color pictures gotten $R_L$, $G_L$ and $B_L$ (represented as vectors). It should be noted that the evaluation function J does not have to be this one. Optionally, a term of Equation (13) may be replaced with a term of a similar equation or a new term indicating a different condition may be added.

Next, the frame rate increasing processing section 103a obtains the respective pixel values of a target moving picture that make the J value of Equation (13) as small as possible (and hopefully minimize it), thereby generating the respective color pictures $R_O$, $G_O$ and $B_O$ of the target moving picture. The target moving picture g that minimizes the evaluation function J may be obtained by solving Equation (14) in which J differentiated with each of the pixel value components of the respective color pictures $R_O$, $G_O$ and $B_O$ of the target moving picture is supposed to be zero. Alternatively, the target moving picture g may also be obtained by an iteratively computing optimization method such as the steepest gradient method.

$$\frac{\partial J}{\partial R_O(x, y, t)} = \frac{\partial J}{\partial G_O(x, y, t)} = \frac{\partial J}{\partial B_O(x, y, t)} = 0 \quad (14)$$

Finally, in Step 308, the target moving picture generated is output.

Next, examples of input and output pictures to be obtained with such a configuration will be described. FIGS. 13(a) through 13(d) show a circular subject (indicated by the solid black circle) that is moving toward the lower right corner. In the drawings from FIG. 13 and on, the subject is supposed to include every color component of RGB and the target moving picture is supposed to be an RGB color picture. In those drawings, the larger the RGB pixel values (i.e., the brighter), the closer to the color black those pixels are illustrated in. And the RGB pixel values are supposed to decrease in the order of the solid black pattern, a pattern shadowed with oblique lines and a pattern shadowed with horizontal lines.

FIGS. 13(a) through 13(d) indicate the positions of the subject at respective points in time (t=0, 1, 2, 3) when a series of frames are shot as will be described later. FIGS. 14(a) through 14(d) show, in the order of time (t=0, 1, 2, 3), target moving pictures to be obtained by shooting the subject shown in FIGS. 13(a) through 13(d). In FIG. 14, the blocks indicate respective pixels of the target moving pictures, the subject is indicated by the solid black blocks, and pixels with intermediate pixel values are indicated by the shadows. The target moving picture is supposed to be an RGB color picture. And the purpose is to get the RGB values of each pixel.

First of all, it will be described what picture will be obtained when a single-chip color picture is captured at the same resolution as the target moving picture. FIG. 15 shows an example of an RGB color filter arrangement with the same resolution as the target moving picture.

FIGS. 16 to 18 show the pictures in respective colors that have been obtained by shooting the subject shown in FIG. 13 with the color filters described above and subjecting the pictures to RGB color interpolation (i.e., determining the RGB values at all pixel locations). Specifically, FIGS. 16, 17 and 18 show G, R and B pictures, respectively. In this case, the subject is supposed to include every color component of RGB at the same percentage. Portions (a) through (d) of FIGS. 16 to 18 show the pictures generated and the subject pictures at the respective times (t=0, 1, 2, 3) on the left and right hand sides, respectively. Pixels that are reproducing the subject's color are indicated by the solid black blocks, while other pixels with intermediate pixel values are shadowed with the oblique lines and horizontal lines following the order of magnitude of the pixel values. In the examples shown in FIGS. 16 to 18, pixels that are located at the same positions as the color filter shown in FIG. 15 are proper ones and a color picture can be obtained. On the other hand, the colors different from the color filters are obtained by making an interpolation on the values of surrounding pixels. As a result, the color resolution becomes lower than the resolution of the target moving picture shown in FIG. 14.

Next, the picture to be input according to a proposed method will be described with reference to FIGS. 19 through 23. FIG. 19 shows the arrangement of color filters for obtaining the picture to be input according to the proposed method and also shows a difference in exposure time and a difference in frame rate between respective pixels. In FIG. 19, the densities of those filters in the respective colors are twice as high both vertically and horizontally as the resolution of the target moving picture shown in FIG. 14. And as in FIG. 15, R, G and B indicate the colors of respective color filters. An S pixel is associated with one of the three colors of R, G and B. In the following description of this embodiment, the color of S is supposed to be G. However, the advantage of the present disclosure can also be achieved even if G is replaced with R or B. If S is G, the spatial resolution sensible to the human eyes can be increased effectively. Furthermore, the S pixels and the other pixels have different exposure times and different frame rates. The S pixels are obtained by performing a shooting operation at the same frame rate as the target moving picture, while the other pixels are obtained by performing a shooting operation with an exposure time that covers multiple frames of the S pixels. As a result, the pixels other than the S pixels will form a picture with a lower frame rate than the S pixels. In the following description of this example, the pixels other than the S pixels are supposed to form a low frame rate picture to be obtained by performing an exposure process for four frames of the S pixels. FIGS. 20 to 23 show images that are obtained by shooting the subject shown in FIG. 13 using the color filters shown in FIG. 19.

FIG. 20 shows the G pictures that have been gotten for the S pixels in the order of time (t=0, 1, 2, 3). The pictures shown in FIG. 20 have the same frame rate as the target moving picture. FIG. 21 shows a picture that has been gotten for the G pixels. This picture is obtained by performing an exposure process for four frames with respect to the target moving picture, and therefore, represents a blur caused by the subject's motion. In the same way, FIGS. 22 and 23 show R and B pixels of R and B pictures that have been obtained through a long exposure process. In these RGB pictures, a picture of each of the three colors has the same number of pixels as the target moving picture and can achieve the same quantity of light received as the target moving picture through the long exposure process. In Step 301, the pictures that have been gotten as described above are input. Next, in Step 302, the motion between frames of the target moving picture is detected using the S pictures. Next, in Steps 303 through 306, the constraint conditions are set. And in Step 307, RGB pictures with the same frame rate as the target moving picture are generated. As a result of this processing step 307, pictures that are similar to the ones shown in FIGS. 14(a) through 14(d) are obtained for each of R, G and B. These pictures have the same color resolution as the target moving picture. And by using such pictures that have been obtained through the long exposure process, even a high density and very small image sensor can obtain an image without decreasing the sensitivity.

In the example described above, only G pictures are supposed to be obtained through the short exposure process. However, the effect of the present disclosure can also be achieved even if pictures in any other color are shot through such a short exposure process. In particular, if pixels on the same horizontal row as the short exposure G pixels (e.g., R pixels in the example shown in FIG. 19) are shot through the short exposure process, the shooting conditions can be matched on the basis of each horizontal line of the input picture. As a result, the picture can be obtained by the single-chip image sensor more easily in terms of the circuit configuration.

FIGS. 24A and 24B illustrate pixels to have their shooting conditions matched to each other. FIG. 24A illustrates a plurality of square areas (e.g., a square area 6D5) each corresponding to one pixel of the target moving picture. On the other hand, FIG. 24B illustrates separately the input pixels that are included in the square area 6D5.

In FIG. 24A, the G pixels 6D1a through 6D1d, as well as the input R pixels 6D2a through 6D2d on the same row, are obtained through the high frame rate shooting operation. On the other hand, the G pixel 6D4 on the same row as the B pixel 6D3 is obtained through the long exposure, low frame rate shooting. The range of the square area 6D5 corresponds to one pixel range of the picture generated.

In the foregoing description of embodiments, the input picture is supposed to be a picture that has been shot with a single-chip color image sensor such as the ones shown in FIGS. 4A and 4B. However, according to the present disclosure, not just such an input picture but also other input pictures may be used as well. Generally speaking, any other input picture may be used as long as the first and second moving pictures share in common the same color component to the human visual sensation.

For example, as shown in FIG. 25A, the first moving picture may be made up of transparent pixels W (501a through 501d) with the respective color components of RGB. Alternatively, as shown in FIG. 25B, the first and second moving pictures may be made up of two different kinds of green pixels G1 (511a through 511d) and G2 (514) which represent the same color green to the human visual sensation but which have different wavelength characteristics. In the latter case, in the general green wavelength range of 500 nm to 580 nm, the green pixel G1 may detect light falling within the wavelength range of 500 nm to 540 nm and the green pixel G2 may detect light falling within the wavelength range of 540 nm to 580 nm.

If the transparent pixels are used, no light will be lost by color filters in the transparent pixel portion, and therefore, the sensitivity can be improved. On the other hand, if those green pixels G1 and G2 with two different wavelength characteristics are used, then similar colors can be distinguished and the color reproducibility of the image generated can be increased. In any case, if the color filter arrangement is changed in this manner, the transformation from the virtual high resolution, high frame rate RGB pictures into the input picture as defined by Equations (3) to (5) may be adjusted to the new color filters.

As described above, according to the processing of this embodiment, a moving picture, of which the color resolution and sensitivity have both been increased, can be obtained based on moving pictures that have been shot with a single-chip image sensor. In addition, just by changing the methods of getting pictures from a high resolution image sensor to shoot still pictures in a camera that can shoot both still pictures and moving pictures, the color resolution and the sensitivity can both be increased even when a low resolution moving picture is being shot. On top of that, by using a plurality of input pixels in combination, the influence of pixel defects of an image sensor can be reduced as well.

(Embodiment 2)

FIG. 26 illustrates a configuration for an image generation system 130 as a second embodiment. The system of this embodiment also has basically the same configuration as the first embodiment described above. Their major difference is that the system of this embodiment generates a new moving picture without performing the motion detection processing. For that purpose, the image generation device 100 of the first embodiment is replaced with an image generation device 120 according to this embodiment. More specifically, the image generating section 31 provided for the image generation device 120 has no motion detection section unlike the image generating section 30 of the image generation device 100.

FIG. 27 illustrates an internal configuration for the image generating section 31 of this embodiment. FIG. 28 shows the procedure of processing to be carried out by the image generating section 31 of this embodiment. Compared to FIG. 2, the configuration shown in FIG. 27 includes no motion detection section. That is why the flowchart shown in FIG. 28 has no processing steps to detect the motion of pictures (i.e., the processing steps 302 and 303 shown in FIG. 3). In the other respects, the image generating sections 30 and 31 have the same configuration and perform the same processing.

The image generating section 31 includes a picture getting section 2201, an image processing section 2203 and an output section 2206. The picture getting section 2201 and the output section 2206 are substantially the same as the picture getting section 101 and the output section 106 of the first embodiment described above.

In accordance with the conditions that have been set by the first, second and third condition setting sections 2203b, 2203c and 2203d of the image processing section 2203, a frame rate increasing processing section 2203a generates a new moving picture. Even without using motion constraint, the RGB pictures that have been shot through a long exposure process can also have their frame rate increased by collecting information about a frame-by-frame variation in pixel value using the S pixels.

Since no motion constraints are used in the image generation processing of this embodiment, an image is generated by the following Equation (15), which is obtained by removing the motion constraint term from Equation (13):

$$J=|H_R R_H - R_L|^2 + |H_G G_H - G_L|^2 + |H_B B_H - B_L|^2 + |S_R R_H - R_O|^2 + |S_G G_H - G_O|^2 + |S_B B_H - B_O|^2 + Qs \quad (15)$$

Even if no motion constraints are used, the image quality can also be improved by increasing the ratio of the number of high frame rate pixels to that of low frame rate pixels.

If no motion constraints are used, it is not easy to obtain information about a significant motion. However, as the procedure of computation carried out by the image processing section 103 does not depend on the motion of the subject, the computational procedure can be fixed in advance. That is why the processor can be easily optimized or downsized according to the resolutions of the input and output images and the arrangement of color filters, which is beneficial. In addition, by using the best processor, the power dissipation can be cut down and the computation can get done in a shorter time as well.

In the embodiments described above, the image generation systems 110 and 130 are supposed to include a display section 40. However, the display section 40 is not an essential element. FIG. 29 illustrates an image generation system 300 with no display section. The image generation system 300 may be a camcorder with no LCD monitor, for example. And such an image generation system with no display section 40 also falls within the scope of the present disclosure.

Likewise, it is not indispensable to provide the image capturing section 10, either. FIG. 30 illustrates an image generation system 400 with no image capturing section 10. The image generation system 400 may be a display device such as a TV set. Optionally, the image capturing section 10 may be removed from the image generation system 110 shown in FIG. 1. Even if no image capturing section 10 is included, such a display device also falls within the scope of the present disclosure.

In the image generation system 400 shown in FIG. 30, a video signal is received at a picture getting section 25. This video signal is a signal representing a moving picture with multiple color components which has been shot with a single-chip image sensor that has a higher density than a display. And the image generating section 30 of this image generation system 400 performs the processing of the first embodiment described above, thereby generating a new moving picture with an increased frame rate and an increased sensitivity based on that moving picture signal and displaying it.

The present disclosure is easily applicable to a situation where an image that has been shot with either an image sensor of 4K2K grade (which has twice as large a size as a high definition (HD) picture both vertically and horizontally) or more or an image sensor of 8K4K grade (which has four times as large a size as a high definition (HD) picture both vertically and horizontally) or more is displayed on an HD display or a display of 4K2K size (if the picture has been shot in the 8K4K size).

The image generation system 400 can receive such a moving picture with multiple color components in various manners. For example, the image generation system 400 may extract a moving picture with multiple color components from moving picture data that has been written in advance in a semiconductor memory card (such as an SD card) 250 or may extract one from a broadcasting wave via an antenna 251. Alternatively, the image generation system 400 may also get the moving picture over a network 252 such as the Internet. Optionally, in the image generation system 400, any two, or even all, of the semiconductor memory card 250, the antenna 251 and the network 252 may be used as well.

If the image generation system 400 shown in FIG. 30 needs to perform the processing of generating a new moving picture according to the first embodiment, the image generating section 30 needs information about a shooting condition including the exposure timings (FIG. 7) of low frame rate, long exposure R, G and B pixels. For that purpose, the picture getting section 25 may receive a video signal 210 with the format shown in FIG. 8, get information about the shooting condition from the identification header 210a and obtain the moving picture data 210b.

As long as the image generating section 30 can receive the video signal 210 shown in FIG. 8, the video signal 210 may be transmitted by any arbitrary method. For example, the video signal 210 shown in FIG. 8 may be packetized, transmitted on a broadcasting wave, and broadcast over a network.

In the example shown in FIG. 30, the image generating section 30 of the first embodiment is supposed to be provided for the display device 400. However, the image generating section 31 of the second embodiment may be provided instead of the image generating section 30.

Although embodiments of an image generation device according to the present disclosure have been described, those embodiments are just examples of the present disclosure and the present disclosure is not necessarily carried out that way. It will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

For example, in the first embodiment described above, a single moving picture is supposed to be generated based on the four moving pictures, namely, the low frame rate red, green and blue moving pictures and a high frame rate green moving picture. However, a single high frame rate, high resolution moving picture may also be generated based on at least two moving pictures that include at least one of the low frame rate red, green and blue moving pictures and a high frame rate red, green or blue moving picture. In that case, the single-chip color image sensor may have its configuration adjusted to the colors of the moving pictures to use to say the least.

Optionally, part or all of the image generation processing to be carried out by the image generation device of the present disclosure may be performed using dedicated hardware devices. Or the image generation processing of the present disclosure may also be carried out by making a CPU which is built in a computer terminal device, a telecommunications device located at a wireless base station, or a standalone general purpose computer execute a predetermined computer program. The processing procedure of the flowchart illustrated is defined by such a computer program. The CPU that has carried out the computer program may either perform by itself, or instruct other components illustrated to perform, that processing procedure, thereby having the image generation device operate following the processing procedure.

The present disclosure provides an image generation technology for generating a new moving picture based on multiple moving pictures. In particular, the present disclosure can be used as an image generation device for generating a high frame rate color moving picture based on a high frame rate moving picture and a low frame rate moving picture (or still picture), a video appliance or system in which such a device is built, or an image processing program, to name just a few.

What is claimed is:

1. An image generation device which generates a new moving picture of a subject based on first, second, third and fourth moving pictures that represent first, second, third and fourth color components of the subject, respectively, and that have been shot with a single-chip color image sensor, which detects light rays including the first, second, third and fourth color components, respectively, wherein the first and second color components are the same color component, and wherein the third and fourth color components are not only different from the first and second color components but also different from each other, and wherein as the first moving picture has been shot in a longer exposure time than the second moving picture, the first moving picture has a lower frame rate than the second moving picture, and wherein the third and fourth moving pictures have as high a frame rate as the second moving picture, and wherein each of three video signals respectively representing the second, third and fourth moving pictures includes an identification header, containing information about a time lag between exposure timings, and moving picture data, and wherein the image generation device comprises:
a getting section configured to get the video signals representing the first, second, third and fourth moving pictures, respectively, the getting section getting at least the video signals representing the second and third moving pictures at different timings;
a processing section configured to generate a new moving picture that has as high a frame rate as the second moving picture based on the respective video signals representing the first, second, third and fourth moving pictures that have been gotten; and
an output section configured to output the new moving picture.

2. The image generation device of claim 1, wherein the getting section gets video signals representing the first and second moving pictures, of which the first and second color components are identical with each other.

3. The image generation device of claim 2, wherein the getting section gets video signals representing the first and second moving pictures in the color green.

4. The image generation device of claim 1, wherein the getting section gets a video signal representing the first moving picture in the color green and a video signal representing the second moving picture that is comprised of multiple color components including a color green component.

5. The image generation device of claim 3, wherein the wavelength range of the color green includes first and second wavelength ranges, and
wherein the getting section gets a video signal representing the first moving picture falling within the first wavelength range and a video signal representing the first moving picture falling within the second wavelength range.

6. The image generation device of claim 1, wherein the getting section gets a video signal representing the first moving picture in the color green, a video signal representing the second moving picture in the color green, a video signal representing the third moving picture in the color red, and a video signal representing the fourth moving picture in the color blue.

7. The image generation device of claim 1, wherein the getting section gets a video signal representing the first moving picture in the color green, a video signal representing the second moving picture comprised of red, green and blue components, a video signal representing the third moving picture in the color red, and a video signal representing the fourth moving picture in the color blue.

8. The image generation device of claim 1, wherein the processing section generates pixels that form multiple frames of the new moving picture representing the first, third and fourth color components based on pixels that form part of multiple frames of the first moving picture, a pixel that forms part of one frame of the second moving picture, a pixel that forms part of one frame of the third moving picture, and a pixel that forms part of one frame of the fourth moving picture, the pixels of the first, second, third and fourth moving pictures having been captured using four adjacent pixels on the single-chip color image sensor.

9. The image generation device of claim 1, wherein the new picture generated by the processing section has a smaller number of pixels than the single-chip color image sensor.

10. The image generation device of claim 1, wherein the number of pixels of the new picture generated by the processing section is smaller than the sum of the respective numbers of pixels of the first and second moving pictures.

11. The image generation device of claim 1, wherein the respective color components of the first and second moving pictures include the same color component, and wherein the image capturing section shoots in the same exposure period as for pixels that form the same horizontal line of the single-chip color image sensor.

12. An image generation system comprising:

an image capturing section including a single-chip color image sensor configured to detect a light ray including a first color component and a light ray including a second color component;

the image generation device of claim 1; and an image output section configured to output the new moving picture that has been supplied from the image generation device, wherein the image capturing section obtains a video signal representing a first moving picture that is a moving picture that represents a first color component of the subject and a video signal representing a second moving picture that is a moving picture that represents a second color component of the subject using the single-chip color image sensor, and as the first moving picture is shot in a longer exposure time than the second moving picture, the first moving picture has a lower frame rate than the second moving picture.

13. An image generation system comprising:

the image generation device of claim 1;

an image output section configured to output the new moving picture that has been supplied from the image generation device; and a display device configured to display the new moving picture that has been output from the image output section.

14. The image generation system of claim 13, wherein the image generation device gets the video signals representing the first and second moving pictures via at least one of a memory card, an antenna and a network.

15. An image generating method for generating a new moving picture of a subject based on first, second, third and fourth moving pictures that represent first, second, third and fourth color components of the subject, respectively, and that have been shot with a single-chip color image sensor, which detects light rays including the first, second, third and fourth color components, respectively, wherein the first and second color components are the same color component, and wherein the third and fourth color components are not only different from the first and second color components but also different from each other, and wherein as the first moving picture has been shot in a longer exposure time than the second moving picture, the first moving picture has a lower frame rate than the second moving picture, and wherein the third and fourth moving pictures have as high a frame rate as the second moving picture, and wherein each of three video signals respectively representing the second, third and fourth moving pictures includes an identification header, containing information about a time lag between exposure timings, and moving picture data, and wherein the method comprises the steps of:

getting the video signals representing the first, second, third and fourth moving pictures, respectively, at least the video signals representing the second and third moving pictures being gotten at different timings;

generating a new moving picture that has as high a frame rate as the second moving picture based on the respective video signals representing the first, second, third and fourth moving pictures that have been gotten; and outputting the new moving picture.

* * * * *